United States Patent
Djokovic et al.

(10) Patent No.: US 7,415,086 B2
(45) Date of Patent: Aug. 19, 2008

(54) MULTI-CHANNEL COMMUNICATION SYSTEM FOR MULTIPLE INPUT, MULTIPLE OUTPUT PROCESSING OF AN ENCODED SIGNAL

(75) Inventors: Igor Shen Djokovic, Costa Mesa, CA (US); Richard Dale Wesel, Manhattan Beach, CA (US); E. James Infusino, Long Beach, CA (US); Michail Konstantinos Tsatsanis, San Clemente, CA (US)

(73) Assignee: Aktino, Inc., Irvine, CA (US)

( * ) Notice: Subject to any disclaimer, the term of this patent is extended or adjusted under 35 U.S.C. 154(b) by 832 days.

(21) Appl. No.: 10/717,702

(22) Filed: Nov. 19, 2003

(65) Prior Publication Data

US 2005/0053097 A1 Mar. 10, 2005

Related U.S. Application Data

(63) Continuation-in-part of application No. 10/658,117, filed on Sep. 8, 2003.

(51) Int. Cl.
*H04B 1/10* (2006.01)

(52) U.S. Cl. ............... 375/350; 375/348; 375/349; 370/497

(58) Field of Classification Search ......... 375/260–261, 375/267, 285, 316, 346–350; 370/210, 497; 455/132
See application file for complete search history.

(56) References Cited

U.S. PATENT DOCUMENTS

| | | | |
|---|---|---|---|
| 5,285,474 A | 2/1994 | Chow et al. | |
| 5,479,447 A | 12/1995 | Chow et al. | |
| 5,673,290 A | 9/1997 | Cioffi | |
| 5,887,032 A | 3/1999 | Cioffi | |
| 6,252,901 B1 | 6/2001 | Mueller et al. | |

(Continued)

FOREIGN PATENT DOCUMENTS

WO WO 03/105339 12/2003

(Continued)

OTHER PUBLICATIONS

Eric W. Weisstein, "Eric Weisstein's World of Mathematics—Diagonal Matrix", © 1999 CRC Press LLC, © 1999-2003 *Wolfram Research, Inc.*, 2 pages.

(Continued)

*Primary Examiner*—Khanh C Tran
(74) *Attorney, Agent, or Firm*—Weide & Miller, Ltd.

(57) ABSTRACT

A method and apparatus is disclosed for processing two or more encoded signals received over a multi-channel communication system to cancel or mitigate coupling and the effects of the channel on the two or more encoded signals. In one embodiment a multi-channel communication system utilizes DMT processing and some form of encoding, such as block coding or convolutional coding. To recover the transmitted signal, processing in the receiver may comprise MIMO processing in conjunction with decoding. The MIMO processing may be configured with decision directed processing to thereby generate one or more cancellation signals based on isolated error terms. Decoding occurs on encoded signals after MIMO processing. Memory may be interspersed or available throughout the system to store incoming symbols that have not yet undergone decoding and MIMO processing. Decoding and MIMO processing may occur sequentially through the channels.

50 Claims, 16 Drawing Sheets

U.S. PATENT DOCUMENTS

| | | | |
|---|---|---|---|
| 6,298,050 B1 * | 10/2001 | van Heeswyk et al. | 370/335 |
| 6,345,071 B1 | 2/2002 | Hamdi | |
| 6,351,499 B1 * | 2/2002 | Paulraj et al. | 375/267 |
| 6,520,744 B1 | 2/2003 | Verbin et al. | |
| 6,567,464 B2 | 5/2003 | Hamdi | |
| 6,587,502 B1 | 7/2003 | Hendrichs et al. | |
| 6,711,207 B1 | 3/2004 | Amrany et al. | |
| 7,020,110 B2 * | 3/2006 | Walton et al. | 370/334 |
| 2001/0048667 A1 | 12/2001 | Hamdi | |
| 2003/0026282 A1 | 2/2003 | Gross et al. | |
| 2003/0081759 A1 | 5/2003 | Harris | |
| 2003/0086362 A1 | 5/2003 | Hasegawa et al. | |
| 2003/0123487 A1 | 7/2003 | Blackwell et al. | |
| 2003/0189999 A1 * | 10/2003 | Kadous | 375/439 |
| 2004/0085987 A1 | 5/2004 | Gross et al. | |
| 2004/0105465 A1 | 6/2004 | Gross et al. | |
| 2004/0223511 A1 | 11/2004 | Tzannes | |

FOREIGN PATENT DOCUMENTS

| | | |
|---|---|---|
| WO | WO 03/105352 | 12/2003 |

OTHER PUBLICATIONS

Steffen Trautmann, et al., "A New Equalizer for Multitone Systems Without Guard Time", *IEEE Communications Letters*, vol. 6, No. 1, Jan. 2002, pp. 34-36.

Jeffrey Wu, et al., "Efficient Matrix Multiplication Methods to Implement a Near-optimum Channel Shortening Method for DMT Transceivers", The University o Texas at Austin, Asilomar Conference, Oct. 30, 2000, 14 pages.

J. Cioffi, "Digital Duplexing: VDSL Performance Improvement by Aversion of Frequency Guard Bands (TD13)", ETSI TM6 Endinburgh, Sep. 20-24, 1999, pp. 1-16.

Lei Wang, et al., "Low-Power AEC-Based MIMO Signal Processing for Gigabit Ethernet 1000Base-T Transceivers", Copyright 2001, ACM 1-58113-371-5/01/0008, pp. 334-339.

Arthur Redfern, et al., "Expanding the Reach of ADSL", http://www.commsdesign.com/story.OEG20030717S0028, Jul. 17, 2003, 2 pages.

* cited by examiner

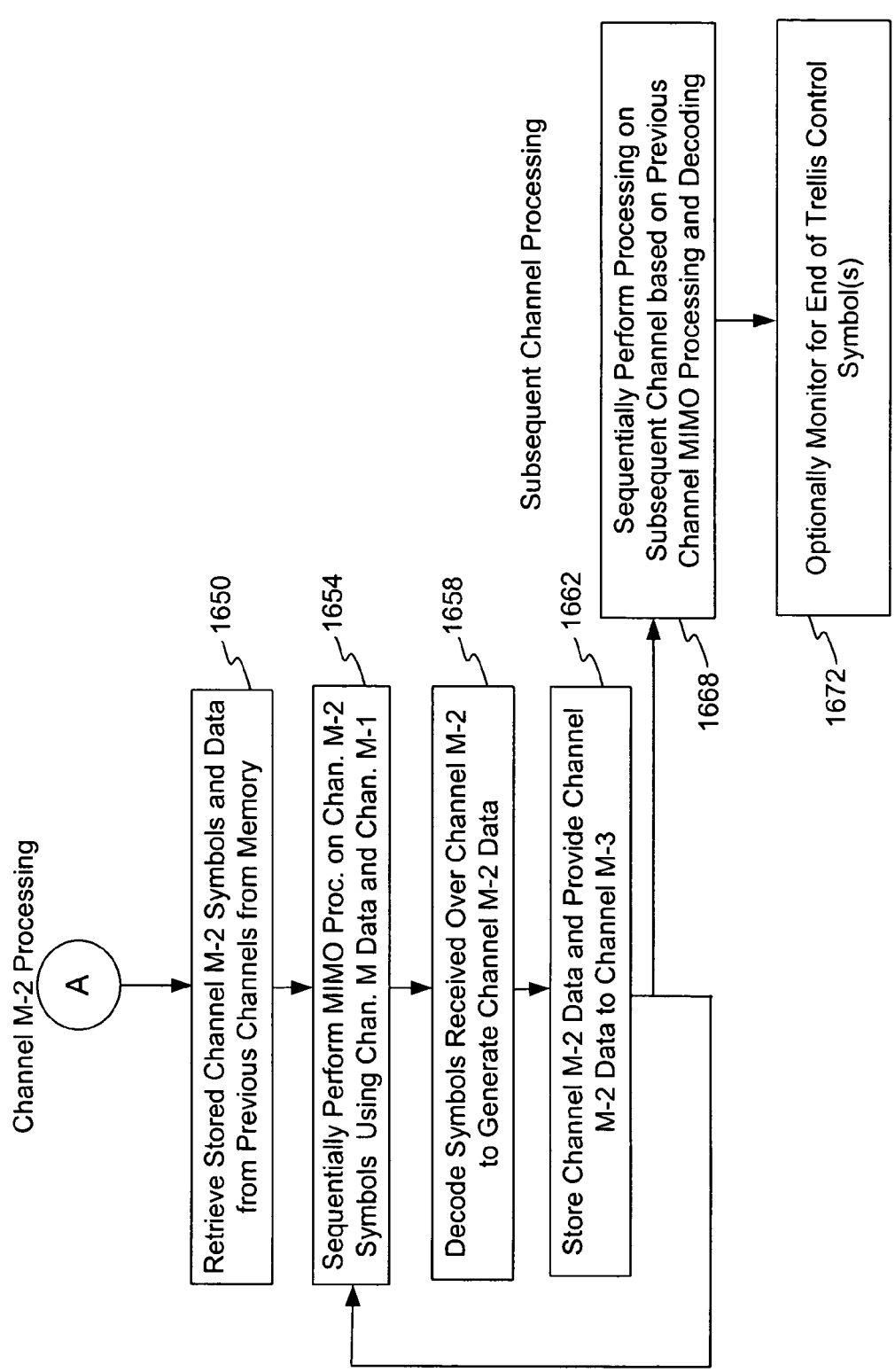

US 7,415,086 B2

MULTI-CHANNEL COMMUNICATION SYSTEM FOR MULTIPLE INPUT, MULTIPLE OUTPUT PROCESSING OF AN ENCODED SIGNAL

RELATED APPLICATION DATA

This application is a continuation-in-part of U.S. patent application Ser. No. 10/658,117, filed Sep. 8, 2003.

FIELD OF THE INVENTION

The invention relates to multichannel data transmission systems and more particularly to a method and apparatus for the removal of crosstalk and other interference in a multi-channel communication system.

RELATED ART

It is commonly accepted practice to transmit data between remote locations over some form of transmission medium. The growing popularity of electronic data exchange is increasing the demand for high rate data transmit speeds between remote locations. Multichannel communication systems have found application in many situations it is desirable to increase the rate of data exchange. The use of multiple channels often increases the effective transmit rate over a single channel system. Examples include wireless communication systems with multiple transmit and multiple receive antennas and Ethernet systems (using four copper pairs per link).

In those examples, information is transmitted in a coordinated fashion across the multiple channels to utilize all of the channels of the physical transmission medium. Further, coordinated multichannel signaling can be utilized in applications where a point-to-multipoint communication link is desired. One example is the case where a wireless base station communicates with multiple mobile transceivers. Another example includes the case of DSL access multiplexers in a telephone central office communicating with multiple customer DSL modems in a star network using one pair per customer.

As a drawback to these prior art systems, interference is often a major degradation factor limiting the performance of communication systems. In the single channel transmission systems, intersymbol interference (ISI) is a major impairment and modern transceivers employ a variety of techniques to mitigate it (channel equalization). In multichannel communication systems there is further interference due to interactions across the communication channels. This interaction across communication channels is often referred to as crosstalk. For example, in wireline communications crosstalk is generated due to electromagnetic coupling when copper pairs travel in close proximity for long distances, or even short distances depending on the relative signal strengths. In wireless communications, crosstalk is generated when multiple users transmit signals whose energy partially overlaps in frequency and/or time.

Crosstalk is classified as near end (NEXT) or far end (FEXT) crosstalk depending on the location of the aggressor transmitter, i.e., whether the aggressor transmitter is at the near end or the far end in reference to the victim receiver. Furthermore, in the context of a multichannel system, crosstalk is often classified as self or alien crosstalk. Self crosstalk originates from the transmitters which are part of the coordinated multichannel transceiver. Alien crosstalk originates from the transmitters which are not part of the coordinated multichannel transceiver. Alien crosstalk can be particularly troublesome because it originates from other transmitters or channels (e.g., legacy systems) that are not part of the system under design and to which the system under design does not have access to for purposes of crosstalk cancellation.

Prior art systems suffer from the drawback of being unable to adequately remove or account for unwanted crosstalk. As a result, the effective data transmit rate may be reduced below desired levels or below those levels that are desired or otherwise achievable. In other instances repeated occurrences of re-transmit requests may slow operation. This is especially problematic in multi-channel communication systems due to such systems primary function being a highly efficient and high-speed communication system.

There is therefore a need in the art for a method and apparatus to overcome the drawbacks of crosstalk in multichannel communication systems. The present invention, which is described below in various embodiments, provides a solution to these drawbacks and provides additional benefits which are also discussed.

SUMMARY

To overcome the drawbacks of the prior art, the method and apparatus described herein reduces self and alien NEXT and FEXT crosstalk in multichannel transmission systems. It is contemplated that any multichannel environment may benefit from the method and apparatus described herein including, but not limited to, twisted copper, coax cable, fiber optic, free space, wireless, or any other metallic or multichannel medium.

In one embodiment a method for filtering two or more signals received over two or more primary channels in a multichannel communication system is disclosed. This method may comprise the steps of receiving two or more signals over two or more primary channels such that the two or more primary channels are adjacent (i.e., receive interference from) at least one alien channel and then pre-processing at least one the two or more signals to create two or more pre-processed signals. The two or more pre-processed signals are provided to a matrix filter and the matrix filter is configured with a transfer function that is the inverse of the two or more channels (including their inter-coupling channels) to thereby cancel the unwanted coupling onto the two or more primary channels from the primary channels. The matrix filter is also configured to reverse the phase and amplitude distortions of the channel on each of the two or more signals. Next the matrix filter may process the two or more pre-processed signals to generate two or more output signals and then process the two or more outputs to isolate a noise term associated with at least one channel. This noise term is then filtered to generate at least one noise cancellation signal which is combined with at least one of the two or more output signals, wherein combining the noise cancellation signal with at least one of the two or more output signals cancels unwanted noise on the at least one of the two or more output signals.

In one embodiment the step of pre-processing the two or more received signals comprises discrete multi-tone type processing. The matrix filter may comprise a feed forward matrix filter configured to cancel self FEXT and distortion caused by transmission through a channel. In one embodiment the noise term comprises the difference between an output signal from the feed forward matrix filter for a particular channel and an output from a slicer (or data detector) for a particular channel. In one embodiment the matrix filter comprises a digital signal processor executing software code. It is contemplated that there may be twelve channels and the step of filtering the noise term may comprise providing the noise term to a filter that is tailored to generate a cancellation signal capable of canceling noise on one or more subsequent channels. In other embodiments there may be any number of channels. Various embodiments may comprise six to fourteen channels.

Also disclosed herein is a system for processing two or more signals associated with a multi-channel communication path wherein a signal is associated with each channel of the multi-channel communication path. This system cancels coupling onto the two or more signals from other of the signals associated with a multi-channel communication system or signals associated with other communication systems. This system may comprise a first filter system and a second filter system. The first filter system may comprise two or more inputs configured to receive the two or more signals and at least one multiplier associated with each channel of the multi-channel communication path. The multipliers are configured to perform multiplication between the signal associated with the channel and at least one filter value multiplier to create a first filter system output associated with each channel. The first filter may also have two or more outputs configured to provide the first filter system output to the second filter system.

The second filter system may comprise a decision device associated with each channel to generate a decision signal and a first junction associated with each channel that is configured to combine the decision signal with the first filter system output or a signal based on the first filter system output. This combination generates a noise signal and at least one filter configured to process the noise signal to generate a cancellation signal. The second filter system also comprises at least one second junction configured to combine the cancellation signal with a first filter system output to thereby cancel noise from at least one first filter system output.

It is contemplated that the coupling may comprise alien FEXT and alien NEXT. In various embodiments the decision device comprises a slicer and the decision signal represents a decision regarding an aspect of transmitted signal value. In one embodiment the first filter system comprises an M by M matrix filter and the variable M represents the number of channels. In one embodiment the channels comprise a first through Mth channel and the first filter system output comprises a first filter system output associated with each channel and the second filter system operates on a first channel signal to generate a first channel noise cancellation signal that is provided to at least the second channel to cancel noise on the second channel. Furthermore, it is contemplated that the second channel signal, after combination with the first channel noise cancellation signal, is provided to a decision device associated with the second channel and a cancellation signal may be provided to a third channel that accounts for the noise filtered from the signal on the first channel and the signal on the second channel. This process is repeated until all M channels are exhausted. In particular, in one embodiment the Mth (last) channel will be combined with noise cancellation signals from all previous M−1 channels.

In yet another embodiment a method is disclosed for processing two or more received primary signals to cancel unwanted coupling onto the two more primary signals from alien signals. This method comprises receiving two or more signals, such that each of the two or more signals comprises primary components and coupling components. For a first signal of the two or more signals the method performs a decision operation to isolate the primary component and then subtracts the primary component from the first signal to isolate the coupling component. Filtering occurs on the coupling component to generate a cancellation signal and then the method combines the cancellation signal with the second signal of the two or more signals to remove at least a portion of the coupling component from the second signal.

In one embodiment the two or more signals comprises twelve signals received over twelve twisted pair conductors. In other embodiments the number of channels may comprise six to fourteen channels. In one embodiment the filtering comprises multiplying the coupling component by a complex number to generate a cancellation signal. It is contemplated that the coupling component may comprise alien NEXT, alien FEXT, or both.

This method may also comprise the steps of performing a decision operation on the second signal to isolate the primary component of the second signal and then subtracting the primary component of the second signal from the second signal to isolate the coupling component of the second signal. This method may then filter the coupling component of the second signal to generate a second cancellation signal and combine the cancellation signal from the first channel and the second cancellation signal with a third signal to remove at least a portion of the coupling component from the third signal.

It is contemplated that this method may first process the two or more signals with a feed forward matrix filter to reverse the effects of the channel and that matrix filter performs matrix multiplication with one or more complex values on the two or more signals. In the case where there is no coupling among the primary signals in the multichannel communication system, it is further contemplated that the feed forward matrix filter can be simplified to a diagonal matrix filter. In this case, each primary signal is filtered only by a feed forward single channel filter avoiding the complexity of multichannel feed forward filtering, before subsequent processing for alien coupling.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

FIGS. 16A and 16B illustrate an operational flow diagram of an example method of multiple-input, multiple-output processing on a convolutionally encoded signal.

DETAILED DESCRIPTION

Figure 1:
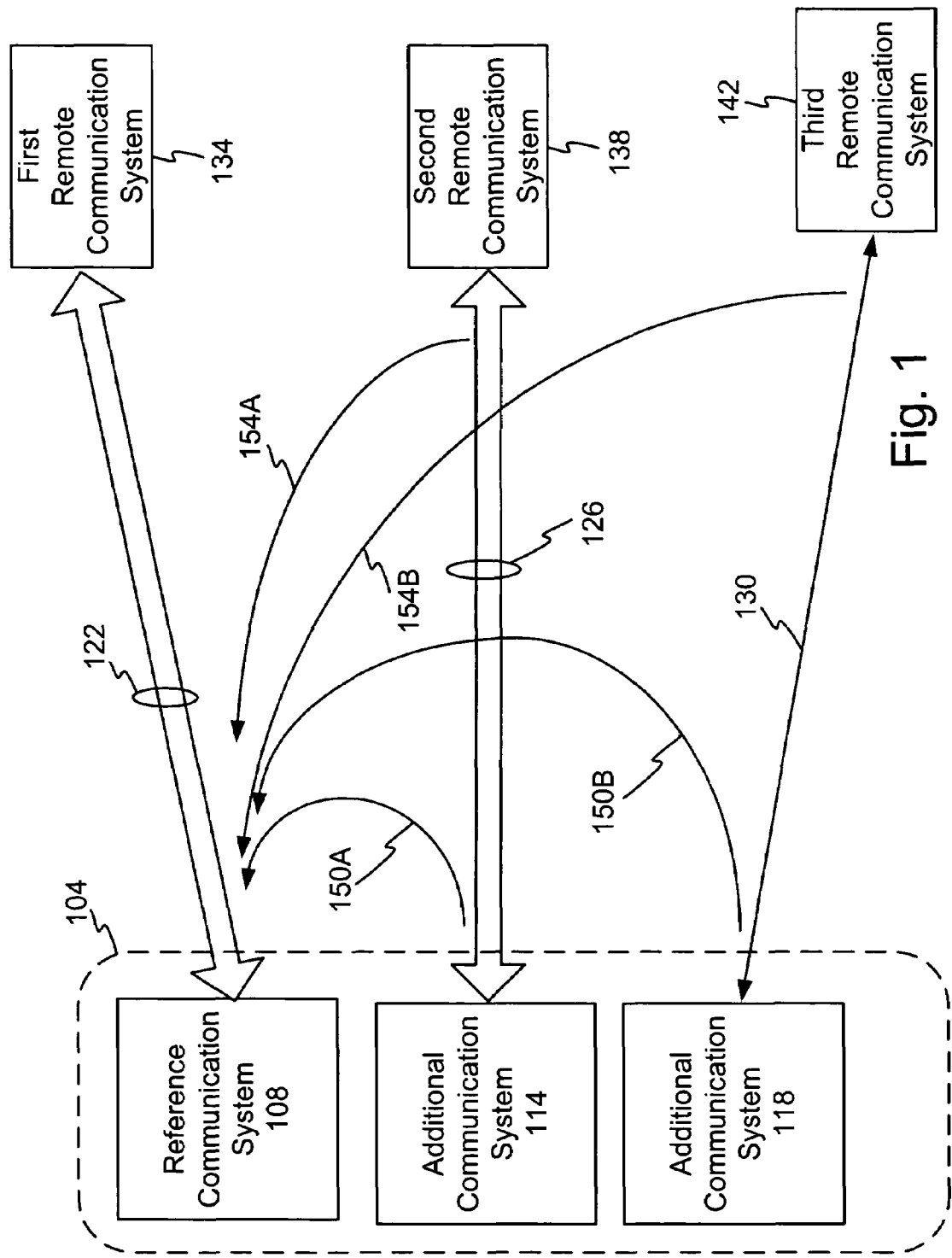
FIG. 1 illustrates a block diagram of an example environment of use of the method and apparatus described herein.

Before discussing the particulars of the claimed method and apparatus, a discussion of example environments for use of the invention may aid the reader in their understanding. FIG. 1 illustrates an example environment of use of the present invention. FIG. 1 is provided for the purposes of understanding and hence the invention should not be limited to environments of use as that shown in FIG. 1. As shown a plurality of communication systems or stations is shown, each of which communicates over one or more channels. In particular, located at a first location 104, such as a central office or internet service provider, is a reference communication system 108. In addition, one or more additional communications systems 114, 118 may also be located at the first location 104. The term reference communication system 108 is defined to mean the communications system under design or from which crosstalk analysis occurs. It is contemplated that the communication systems 108, 114, 118 at the first location may communicate with one or more remote locations 134, 138, 142 respectively.

Shown in the example environment of FIG. 1, the reference communication system 108 communicates with the first remote communication system 134 over a multiple channel communication path 122, which may be referred to as the reference channel as it is associated with the reference communication system. Use of the multiple channel communication path 122 allows increased bandwidth over single channel systems. Similarly, the additional communication system 114 communicates with the second remote communication system 138 via a multiple channel communication path 122 while the additional communication system 118 communicates over with the third remote communication system 142 via a single channel communication path 130. The channel discussed herein may comprise any type of signal path such as but not limited to channel twisted pair metallic conductors, wireless, optical, coax, etc. An example of wireline multi-channel system is a Gig-Ethernet transmission system over four copper pairs. Another example is a DSL multipair system. Further, an example of a wireless multichannel system may be a system with multiple transmit and receive antennas or a system that transmits over multiple frequency bands.

As can be appreciated, although the remote communication systems 134, 138, 142 may be located at diverse locations, the channels 122, 126, 130 may be in close proximity for at least a portion of the distance of the channel(s). Moreover, since the communication systems 108, 114, 118 are all located at the first location 104, it is contemplated that the channels 122, 126, 130 will be in close proximity for at least the distance near the first location, such as for example in the case of twisted pair entering the central office via a common bundle of twisted pair copper cable.

Due to the proximity of the channels 122, 126, 130 it is anticipated the crosstalk will exist on the reference channel 122 due to coupling of the signals on channels 126, 130 onto the reference channel. Such crosstalk is shown in FIG. 1 as alien near end cross talk (NEXT) 150A, 150B and alien far end cross talk (FEXT) 154A, 154B. As is understood by one of ordinary skill in the art the term alien crosstalk signifies that the crosstalk is generated by channel(s) other than those in the one or more channels that comprise the reference channel(s). Although not shown, it is contemplated that the reference channel, being comprised of two or more individual channels or conductors, will also generate crosstalk, which is referred to herein as self crosstalk, due to the proximity of the two or more conductors that comprise the two or more channels 122. Those of ordinary skill in the art understand the nature of self crosstalk and the associated drawbacks and hence it is not described in detail herein.

In one example embodiment the reference communication system 108 and the first remote communication system 134 comprise communication systems configured to operate in accordance with a DSL standard utilizing two or more channels in an effort to maximize the data transmit rate utilizing presently existing twisted pair conductors. In this manner the benefits of presently installed cabling may be realized while also maximizing bandwidth between communication systems. In one embodiment the channel 122 comprises six to fourteen twisted pair conductors, although in other embodiments any number of conductors or conductor pairs may be utilized to gain the benefits of the method and apparatus described herein. In addition, communication standards other than DSL may be adopted for use with the method and apparatus described herein. Thus, the claims that follow should not be construed as being limited to a particular DSL standard or twisted pair conductors.

In one example environment of use, the method and apparatus disclosed herein is utilized in a multi-channel communication system based on a DSL communication standard. As such, a discrete multi-tone transmission (DMT) scheme is utilized to maximize channel bandwidth and overcome processing challenges created by ISI. In one embodiment the method and apparatus described herein operates on each frequency bin. In one embodiment this comprises 256 different tones and the processing described herein may operate on each tone. In other embodiments a different number of tones may be utilized. While it is contemplated that time domain filters may be utilized for processing in the time domain, in the embodiment described herein processing occurs in the frequency domain.

Figure 2A:
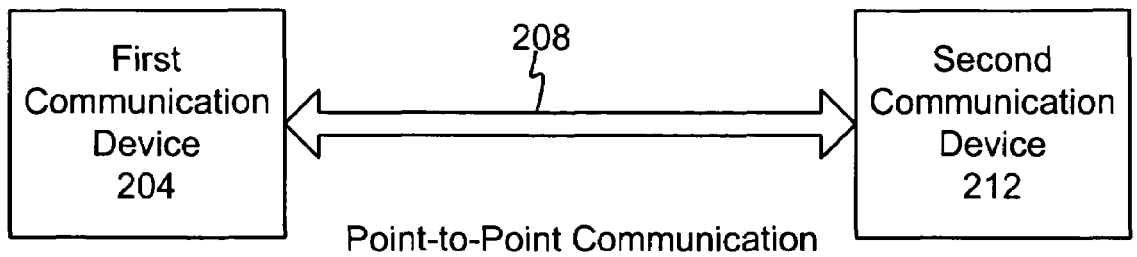
FIG. 2A illustrates a block diagram of an example embodiment of a point-to-point communication system.
Figure 2B:
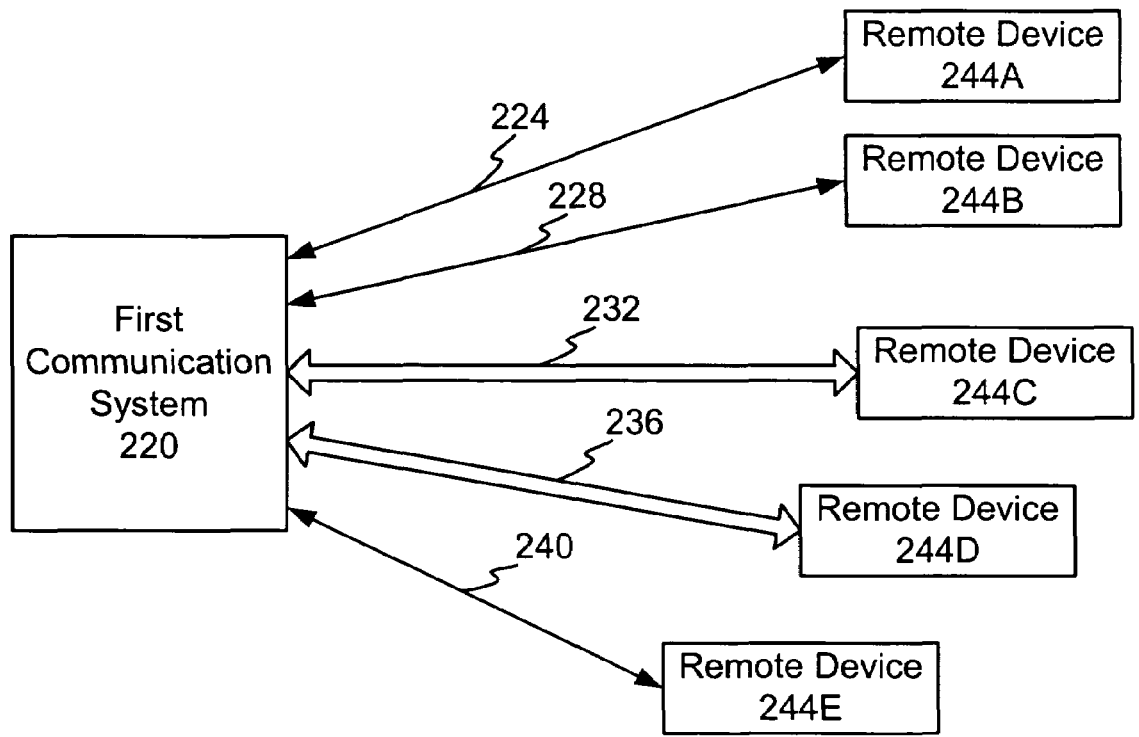
FIG. 2B illustrates a block diagram of an example embodiment of a point-to-multipoint communication system.

FIG. 2A and FIG. 2B illustrate two exemplary communication system configurations for use with the method and apparatus described herein. It is contemplated that the method and apparatus described herein may be applied to both point-to-point and point-to-multipoint communication systems and additional other communication system configurations as may be enabled by one or ordinary skill in the art.

FIG. 2A illustrates an example embodiment of a point-to-point communication system configuration. As shown a first communication device 204 communicates of a multi-channel communication path 208 with a second communication device 212. Through use of the multi-channel communication path and the processing as described herein, increased data transmit rates may be achieved, as compared to the prior art, while utilizing existing communication medium. It is contemplated that the multi-channel path 208 may comprises a wired, such as metallic conductor or optic path, or wireless or free space medium.

FIG. 2B illustrates an example embodiment of a point-to-multipoint communication system. As shown a first communication system 220 communicates with two or more remote devices 244A, 244B, 244C, 244D, 244E via the communication paths 224, 228, 232, 236, 240. In this example embodiment communication paths 224, 228 and 240 comprise single channel communication paths while paths 232, 236 comprise multi-channel communication paths. Examples of point-to-multipoint communication systems include, but are not limited to a wireless base station that communicates with multiple mobile transceivers. Another example comprises a DSL access multiplexer in a telephone central office communicating with multiple customer DSL modems in a star network using one pair per customer. In such a configuration, the disclosed invention can be practiced in a different manner in the upstream direction (remote devices to central system) and the downstream direction (central system to remote devices). In particular, in the upstream direction the disclosed invention can be practiced by the receiver of the central system and can operate on the received upstream signals. On the other hand, in the downstream direction, the invention can be practiced by the transmitter of the central system, and can operate on the signals prior to their transmission on the multichannel communication medium. To those skilled in the art, this is generally referred to as "transmitter pre-processing" of the communication signals. Of course, other configurations are possible that would likewise benefit from the teachings contained herein.

With regard to multi-channel communication path systems, multichannel communication systems have found application in situations where one can utilize multiple communication channels to convey information. Examples include wireless communication systems with multiple transmit and multiple receive antennas, gigabit Ethernet systems (using four copper pairs per link), and DSL multipair transmission systems, to name but a few. Through the use of multi-channel paths and the method and apparatus described herein, synergy exists in that the overall bandwidth or data rate possible with the multi-channel path and associated signal processing is greater than the sum of an equal number of single channel communication systems operating individually, such as in a multiplexed configuration. As a result, information is transmitted and processed, both prior to and after transmission, in a coordinated fashion across all channels to maximally utilize the available physical transmission medium. As a result of these benefits, the method and apparatus described herein exploits the multi-channel path environment.

Figure 3:
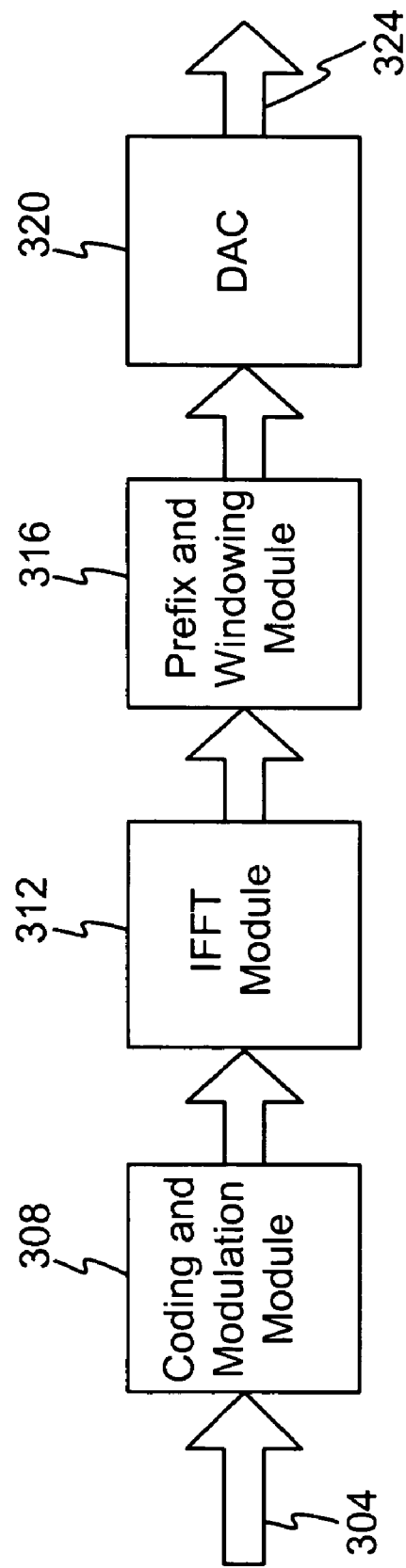
FIG. 3 illustrates a block diagram of an example embodiment of a transmitter.

Turning now to FIG. 3, a block diagram of an example embodiment of a transmitter is shown. Although it is contemplated that the principles described herein may be utilized with any transmission standard, modulation scheme, or encoding scheme, in this example embodiment a vectored DMT transmission system is adopted for use. The transmitter shown in FIG. 1 comprises a DMT transmission system in which a collection of all the signals to be transmitted from all the available channels are processed in sync, with synchronous clocks and frame aligned, through the DMT transmitter blocks as shown.

As stated above, the processing described herein maybe utilized with any communication standard or scheme. Mitigation of intersymbol interference in a single channel (as well as multichannel) systems may be accomplished by appropriate transmitter and receiver filtering (channel equalization). With regard to a DMT system, DMT modulation divides the available bandwidth in multiple parallel frequency channels (tones) and transmits information bits on each tone according to each tone's information capacity. DMT has the benefit of high performance and low complexity as compared to other prior art methods. For example, use of DMT may mitigate numerous intersymbol interference issues.

As shown an input 304 from a network device, computers, switch, or any communication or source device is received at a coding and modulation module 308 for processing in accordance with one or more coding and modulation schemes. In one embodiment the coding and modulation comprises such as may occur with DMT type coding and modulation. U.S. Pat. No. 5,673,290, which is incorporated by reference, provides general information and background regarding DMT type communication transmitters and processing. In one embodiment the output of the coding and modulation module 308 comprises a multi-channel path carrying 256 values which are represented as a magnitude and phase and which at this stage in the processing may be in the frequency domain. As DMT type coding and modulation is generally understood by one of ordinary skill in the art, it will not be described in detail herein. It should be noted that the input 304 to the coding and modulation module 308 may comprise a multi-conductor or multi-channel module and the number of channels associated therewith may be dependant upon the number of channels utilized for communication between remote locations and the particular design choices for of the system designers. The input 304 may also comprise a high speed serial input.

The output of the coding and modulation module 308 feeds into the IFFT module 312 (inverse Fast Fourier Transform). The IFFT module 312 processes the incoming data by performing an inverse Fast Fourier Transform on the incoming data. The transformed data is in turn provided to a prefix and windowing module 316 that is configured to append needed leading and trailing samples of a DMT symbol and other processed data. In one embodiment this comprises time domain multiplication of each real sample by a real amplitude that is the window height. This allows for a smooth interconnection of the samples, which in turn may decreases decay time in the frequency domain. The output of the prefix and windowing module 316 is eventually received at one or more digital to analog converters 320 that transform the data into one or more analog signals, which are to be transmitted over one or more channels. It is contemplated that other or additional processing modules or systems may be included within the transmitter but which are not shown. It is also contemplated that the output channel 324 may comprise a plurality of channels, paths or conductors. As suggested above the output 324 may comprise two or more twisted pair conductors.

Figure 4:
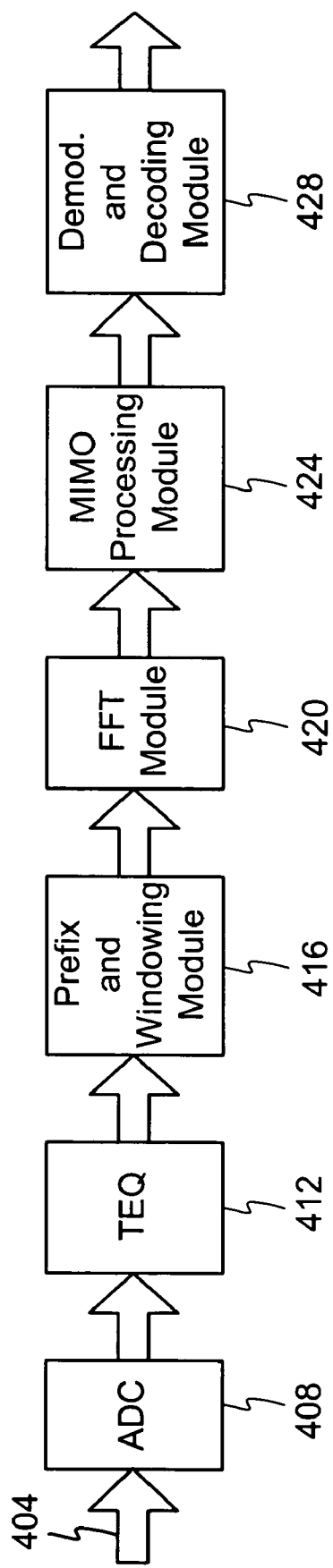
FIG. 4 illustrates a block diagram of an example embodiment of a receiver.

FIG. 4 illustrates a block diagram of an example embodiment of a receiver. The configuration of FIG. 4 is provided for purposes of discussion and not limitation as it is useful in understanding how the method and apparatus of the present invention relates to the other functional aspects of a receiver. As shown, an input 404 is configured to receive an input signal from a transmission medium or one or more intermediate devices that may reside between the transmission medium and the input, such as a transformer or other device. The transmission medium may comprise two or more channels. As it is contemplated that the receiver of FIG. 4 be utilized in a multi-channel environment, the input 404 may comprise a parallel line comprising numerous conductors or channels. Similarly, the devices shown in FIG. 4 and throughout this document may consist of one or more such devices as may be necessary to meet the processing requirements described herein. Thus, in the case of FIG. 4, if the channel 404 were to comprise twelve channels, then the ADC block 408 may comprise twelve individual ADC devices.

The input 404 provides one or more received signals to one or more analog to digital converters (ADC) 408 that convert the one or more incoming signals to a digital format for subsequent processing. Thereafter one or more a time domain equalizers (TEQ) 412 receive and process the one or more signals to reduce or negate the effects of transmission of the signal through the one or more channels. Any type equalization may occur.

After equalization, one or more prefix and windowing modules 416 perform an optional windowing and/or prefixing operation on the one or more signals as would be understood by one of ordinary skill in the art. After the optional windowing operation, one or more FFT modules 420 perform a Fourier Transform on the one or more signals. Any type Fourier Transform may occur including a Fast Fourier Transform operation. The FFT module 420 output(s) are provided to a multiple input, multiple output (MIMO) processing module 424 that is configured to receive the multiple inputs of the multi-channel input to the receiver and perform processing as is described below in greater detail. In the embodiment described therein, MIMO processing module perform processing on the two or more signals to account for the affects of the channel and coupling that may have occurred during transmission. MIMO processing is described below in more detail. The processing that occurs prior to the MIMO processing module may be referred to herein as receiver pre-processing or simply pre-processing.

The output of the MIMO processing module 424 is provided to a de-modulation and decoding module 428 that is configured to de-modulate and decode the one or more received outputs from the MIMO processing module. In one embodiment the demodulation and decoding module 428 reverses the modulation and encoding performed by the transmitter if such was performed. In one embodiment this comprises QAM type modulation and encoding. It is also contemplated that error correcting coding type modulation may occur. In one embodiment, Trellis Coded Modulation may be used. In another embodiment, turbo coding or other coding schemes may be employed.

Thereafter, the one or more signal may be provided to one or more subsequent down stream systems for additional processing or for use by an end user or other system. In a multi-channel communication system each of the multiple channels in the communication system generates cross talk and, in addition, adjacent or nearby channels that are not part of the communication system, but instead associated with other communication systems, will also contribute crosstalk. It can be appreciated that recovery of the original signal can be complex and hence systems of the prior art were unable to effectively meet this challenge. Processing by the MIMO processing block 424 can be configured to overcome this drawback of the prior art.

In one embodiment the output of the FFT module 420 comprises a total of 256 tones on each of fourteen channels or lines for each block, symbol, or register transfer. It is contemplated that the MIMO block 424 may jointly process all of the fourteen channels for each of the 256 tones. Thus processing may occur on one frequency at a time (fourteen channels) as the system cycles through the 256 frequencies, which represent the data. In various different embodiments a different number of channels may be used to provide the requested or desired bandwidth, i.e. data exchange capacity. Although any number of channels may be used, the range of six to fourteen channels may be selected in many applications.

Throughout the following discussion, details regarding the method and apparatus of the invention are provided in a non-mathematical format and, when appropriate, in a mathematical terms with the use of equations. While it is contemplated that there exist numerous way to express the teachings contained herein, use of both a textual description and mathematical nomenclature, at least to some extent, will provide the best and enabling disclosure.

Figure 5:
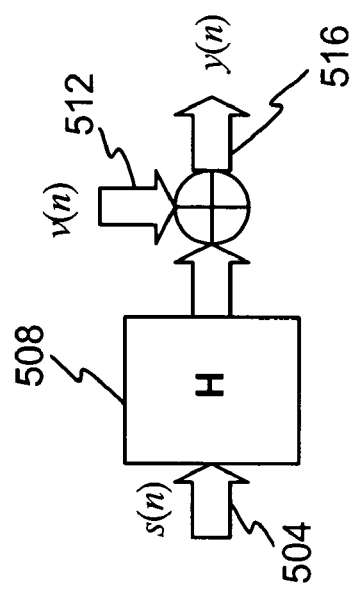
FIG. 5 illustrates a block diagram of a model of a channel with an input signal and an output signal.

FIG. 5 illustrates an example embodiment of a block diagram based on the mathematical model for the received signals at the output of the FFT module 420 or the input to the MIMO processing module 424. As shown in FIG. 5, two or more input signal(s) s(n) 504 are shown as being acted upon by the channel, which may represented as an M×M channel matrix 508 to account for the numerous interactions between self channel coupling. The addition of additive interference or noise v(n) 512 is also shown to account for alien crosstalk. The resulting output y(n) 516 represents the two or more output signals that have passed through and been acted upon by the channel and signals on adjacent channels, i.e. both alien and self NEXT and FEXT. More simply, the signal y(n) 516 to be provided to the MIMO processing module 424 of FIG. 4 is generated by the transmission of the original signal through the channel where the signal on each of the two or more channels is acted upon by self crosstalk, represented by the channel matrix 508, and noise and alien crosstalk, represented by v(n) 512. It is desired in the MIMO processing module to process the multiple inputs to the MIMO processing module to negate or account for the channel matrix's effect on the channel and the noise v(n) so that the original signal may be recovered and performance requirements maintained.

This can be shown mathematically by the following equation:

$$y(\omega_i) = H(\omega_i) s(\omega_i) + v(\omega_i)$$

where $H(\omega_i)$ represents the M×M FEXT channel matrix (assuming M parallel channels), $s(\omega_i) = [s_1(\omega_i), \ldots, s_M(\omega_i)]^T$ is the transmitted vector and $v(\omega_i)$ is the additive interference plus noise. Since $v(\omega_i)$ is expected to be NEXT dominated, it is not assumed to be spatially white, but possesses a spatial correlation matrix $E\{v(\omega_i) v(\omega_i)^H\} = R_v$.

To reduce the complexity of the notation, in the text that follows, the explicit reference to frequency in the signal equations is dropped. This description illustrates that the impairments across lines are limited to within a particular bin, and therefore suggests that the MIMO processing block can operate on a bin by bin manner. A bin, as way of background, comprises a finite range of frequencies that is a subset of the entire available bandwidth. The available bandwidth may be divided into numerous bins and data transmitted within one or more of the bins to thereby segregate data transmission into the various and appropriate frequency bins. Thus, within the MIMO processing module 424 shown in FIG. 4, the crosstalk components that have coupled onto each channel may be accounted for so that the originally transmitted signals may be recovered.

With regard to vector notation, the example equations:

$$r_1 = h_{11} s_1 + h_{12} s_2$$

$$r_2 = h_{21} s_1 + h_{22} s_2$$

may also be written as:

$$\begin{bmatrix} r_1 \\ r_2 \end{bmatrix} = \begin{bmatrix} h_{11} & h_{12} \\ h_{21} & h_{22} \end{bmatrix} \begin{bmatrix} S_1 \\ S_2 \end{bmatrix}$$

which in turn may be simplified and represented in vector notation as:

$\underline{r} = H\underline{S}$

Figure 6:
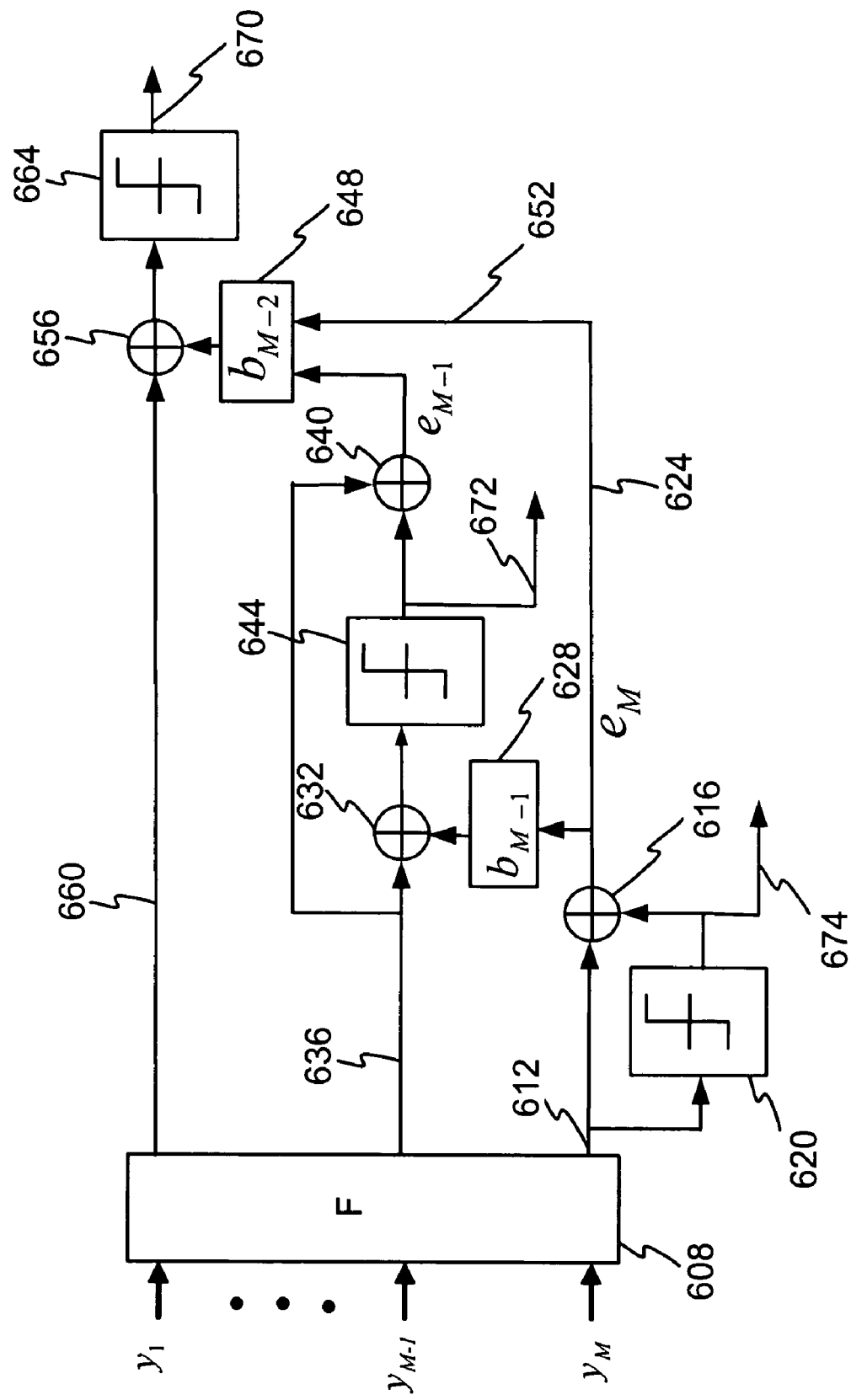
FIG. 6 illustrates a block diagram of an example embodiment of the MIMO processing module as shown in FIG. 4.

FIG. 6 illustrates a block diagram of an example embodiment of the MIMO processing module as shown in FIG. 4. As shown, two or more paths provide signals or inputs $y_1, \ldots, y_{M-1}, y_M$ to an M×M sized matrix F 608 in the MIMO processing module. In one embodiment the inputs signals comprise fourteen values for each of a number of different frequencies in the available bandwidth. In one embodiment the fourteen inputs cycle through 256 different frequencies. In one embodiment the matrix comprises a feed-forward type matrix. The output of the matrix F 608 feeds into a succession of filters, shown to the right of the matrix F. In one embodiment the filter F 608 may be considered a feed forward type structure while the filter structure to the right of filter F may be considered a feedback or decision directed type structure and this descriptive notation may be used herein as an identifier during the description.

In one embodiment the functionality of the matrix F is to mitigate the effects of the self FEXT and any phase or attenuation caused by the channel itself. This may occur by forming a filter matrix which is configured to diagonalize the channel. In one embodiment the matrix filter F 608 in combination with the channel has a transfer function of unity or one. Thus, the matrix F 608 may be configured to invert the self FEXT channel matrix and the affects of the channel. In one embodiment the matrix F 608 may comprise a feed forward processing design. In the embodiment shown in FIG. 6, the matrix F 608 comprises an M×M matrix where M represents the number of lines or channels in the multi-channel communication system.

The matrix filter F 608 may comprise one or more multiplier operations to modify the magnitude and phase of the received signal as desired. The matrix filter F 608 may be configured in software, such as in a DPS or other processor, in hardware, such as with a number of registers, multipliers and memory units, or a combination of both. The claims that follow should not be limited to the particular implementation, but should be interpreted to cover all the various implementations of the method and apparatus disclosed herein.

After processing by the matrix filter, processing by the decision directed portion of the system occurs. In the embodiment shown in FIG. 6, a channel M is output from the matrix 608 and provided to a slicer 620 and junction 616. The term junction is defined to mean a summing junction, adder, subtractor, some combination thereof, or any other device configured to combine two or more signals. The slicer 620 and summing junction 616 generate a signal that is provided on an output M 624, that is in turn also provided to a filter 628. In one embodiment the signal on path 624 comprises the noise or error term between the output of the slicer 620 and the signal on path 612. In this embodiment, the filter 628 is a scalar multiplier configured to potentially modify the phase and magnitude of the signal $e_M$ 624. In one embodiment the filter includes a complex value for the tap multiplier. The function of the filter 628 is to process the portion of the noise isolated on channel M so that it may be subtracted from the subsequent channel. In this manner the system cancels unwanted noise based on knowledge of the noise on already processed channels. The processing cascades through the channels as shown and may be expanded to any number of channels.

In one embodiment, the error term is isolated by re-encoding the decoded data to create re-encoded symbols. These re-encoded symbols are then subtracted from the encoded symbols received over the channel to isolate the error terms. By re-encoding the decoded data for purposes of generating an error term, the data is placed in the same format, namely encoded symbol format. This error term is then subtracted processed or filtered as shown, to create a cancellation signal for use by one or more subsequent channels.

The output from the filter 628 is provided to a junction 632 as is the matrix output on the second and subsequent channel on path 636. The signal on second matrix output 636 is also, in this embodiment, provided to a junction 640. The junction 632 combines the received signals and provides the result to a slicer 644. In one embodiment the output of the filter 628 is subtracted, by the junction 632, from the signal on output 636.

The slicer 644 is configured to perform decision processing on a received signal(s) or value(s) and based on decision analysis, output one or more of a discrete number of outputs. The slicer may comprise or be referred to as a decision device. The output of the slicer 644 is provided to the junction 640. The junction 640 subtracts the slicer output from the signal on path 636 to yield the noise on channel $y_{M-1}$. The output of the junction 640 is provided to a second filter 648 on path 652. The second filter 648, also receives as an input the output signal on output 624, and processes these signal and provides its output to a junction 656. Thus in this embodiment the filter 648 processes the error terms or noises on both paths 636 and 612 that have been isolated by the processing.

The junction 565, which receives the filter output and the signal on the first channel output 660, generates a resulting signal that is provided to a first channel slicer 664. In one embodiment the filter 648 comprises a multi-tap filter configured to have a tap corresponding to each input. In one embodiment each filters tap is associated with a multiplier value, such as a scalar or complex number, selected to isolate coupling from each prior channel that has coupled into the channel of interest. In this manner a filter output signal is generated that cancels the noise that couples from other alien channels. In one embodiment the filters 628, 648, and other subsequent filters in a multi-channel system are configured to account for alien FEXT and alien NEXT In one embodiment the filters 628, 648 comprises one or more multipliers and one or more registers. In an alternative embodiment the filters 628, 648 comprise mathematical operations implemented by appropriate configuration of FPGA or DSP devices. These filters may be embodied in hardware, software, or a combination of both.

The output signals from the MIMO processing block 424 (FIG. 4) comprise the signals that are isolated as the outputs 670, 672, 674 of the slicers 620, 644, 664. Thus it can be seen that the isolated noise on each line is feedback to the other channels in a cascade manner as shown while the output from the filter structure actually comprises the slicer outputs 670, 672, 674. This provides benefits over the prior art as is described herein.

Although only three channels are expressly shown in FIG. 6, it is contemplated that M channels would be processed in this manner, where M is any whole number. This pattern of cascading inputs and outputs would continue in the manner shown. It is contemplated that the number of taps on each subsequent filter in subsequent channels, working from the bottom of FIG. 6 to the top of FIG. 6, would increase to a total value of M−1 taps. In this embodiment, the detection and removal of the useful signal is a sequential process that starts (in this embodiment) from the last channel M and proceeds upwards. Once more residual noise terms become available, they are used (though progressively bigger filters) to clean up the noise in the channel above them. This operation is described in vector equation form below $$\hat{s} = F^H y - B^H e \qquad \text{EQ. 1}$$

where in one embodiment the matrix $B^H$ is an upper triangular matrix with zeroes on the main diagonal. Although only M number of channels are shown, it is contemplated that the structures shown in FIG. 6 may be applied to any number of channels. Stated another way, the processing of the feedback filters 628, 648 operates to whiten the noise to thereby remove any correlation between the noise on the M number of channels.

As an advantage to this embodiment, it operates on the noise terms that are output by the junctions, such as junction 640, 616. This is in contrast to certain prior art systems that may operate on the desired or sliced signal. Prior art systems suffer from the drawback of more complex processing and more complex filters. As will be described herein, the feedforward matrix filter employed in the current invention can be simplified to a diagonal one. This simplification is not possible for certain prior art systems. A further advantage resulting from processing the noise or error terms is that the system is well suited for mitigating alien NEXT and FEXT crosstalk. Certain prior art systems only focus on mitigating self NEXT and FEXT crosstalk. For example, U.S. Patent Application Publication US 2003/0086362 A1 describes a system for reducing NEXT and FEXT. The system described in US 2003/0086362 A1 does not however address alien crosstalk issues and hence does not provide the desired performance in environments that experience alien crosstalk. Because of this difference, such prior art systems are only suitable for situations where no legacy transceivers (and alien crosstalk) are present. The disclosed invention makes multichannel transceiver systems suitable for environments where legacy equipment is already present in the network or where alien interference is present.

Figure 7:
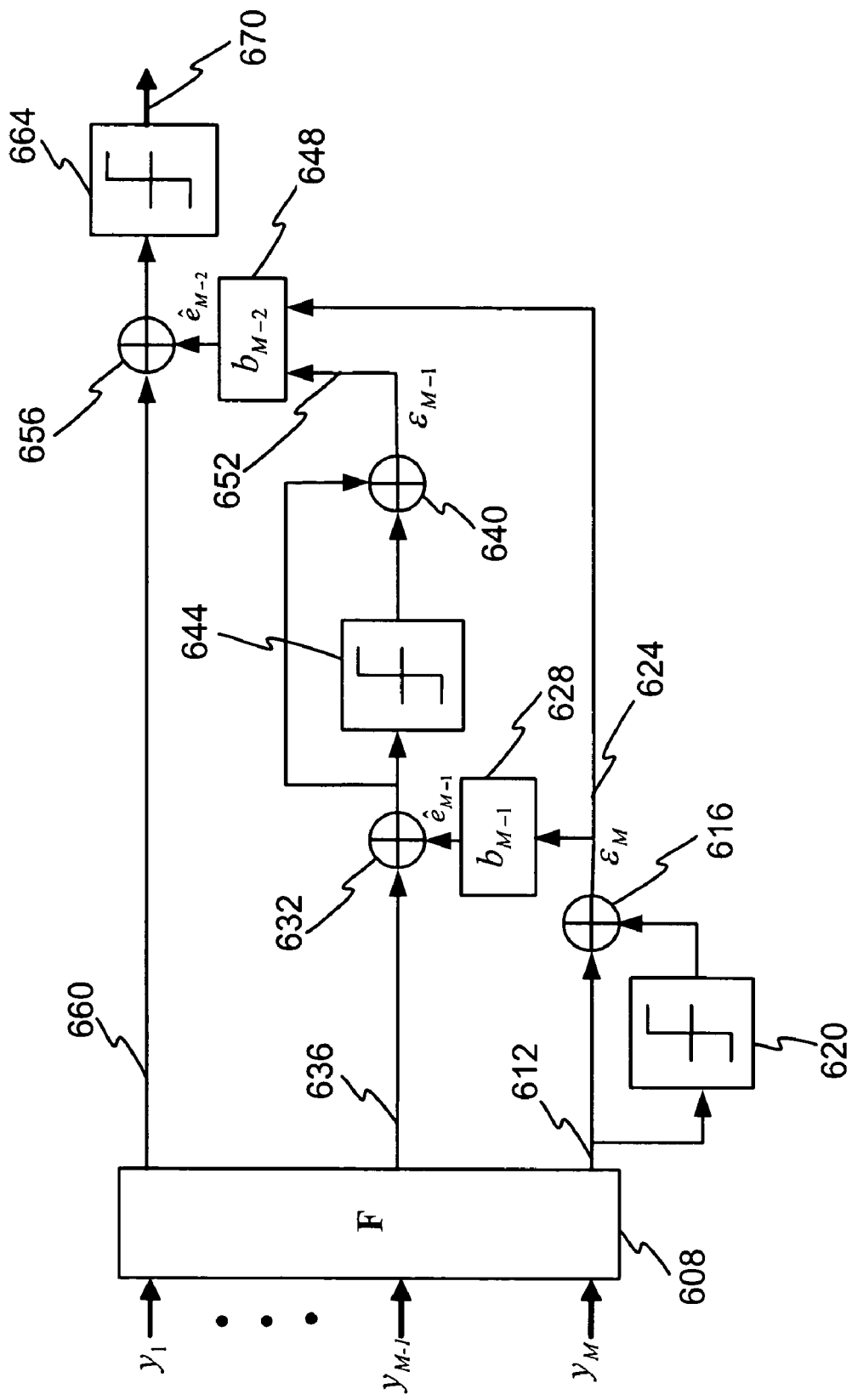
FIG. 7 illustrates a block diagram of an alternative embodiment of the MIMO processing module as shown in FIG. 6.

Turning now to FIG. 7, an alternative embodiment of the MIMO processing module is shown. As compared to FIG. 6, numerous similarities exist and hence identical elements, as compared to those of FIG. 6, are identified with identical reference numerals. Similarly, to avoid repetition, only the aspects of FIG. 7 that differ from those described in FIG. 6 are discussed in conjunction with FIG. 7. Although not expressly show, it should be noted that the output of the MIMO processing block comprises the slicer outputs.

In contrast to FIG. 6, the input to the junction 640 comprises the output from the slicer 644 and the output of junction 632. In this embodiment both inputs to the junction have realized the benefit of the processing performed by the filter 628 and the processing on the signal on the prior channel, such as in this example embodiment channel 612. Hence, in the embodiment of FIG. 6, the feedback filters operate on the alien FEXT and alien NEXT that exists on each channel after the linear processing with the feed-forward filter F. In the embodiment of FIG. 7, as with the embodiment in FIG. 6, the feedback filters operate in a sequential manner on the noise or coupling that exists on each channel after it has been cleaned (or whitened) by the other available noise terms on channels below it. In this manner to processing cascades through the channels. As a result, it is contemplated that in this embodiment the top channel, i.e. channel $y_1$ may have the highest data transmit rate.

In equation terms, this operation is described by the following set of equations:

$$\hat{s} = F^H y - \hat{e}$$

$$\hat{e} = B^H \epsilon$$

$$\epsilon = e - \hat{e}$$

wherein $\hat{s}$ represents the slicer inputs. Similarly to FIG. 6, $\hat{s}$ is formed by the feedforward term $F^H y$ and a feedback term. Also, similarly to FIG. 6, the feedback matrix $B^H$ is upper triangular with zeros on the diagonal. The difference is that the noise cancellation signal $\hat{e} = B^H \epsilon$ is not a filtered version of the noise signal on subsequent lines. It is rather a filtered version of the whitened (or cleaned) noise signal on subsequent lines.

The configuration shown in FIG. 7 has the advantage of utilizing a signal that has gained the benefits of cancellation from the prior channel when isolating the noise term. For example, in FIG. 7 the signal on channel $y_{M-1}$ that is provided to the junction 640 comprises the output from junction 632, and this signal has had the benefit of having the noise cancellation signal from filter 628 subtracted from the signal on path 636. Hence, the noise term isolated by junction 640 may have a higher degree of accuracy as it gains the benefit of the filtering from the previous channel, in the example $y_M$.

Figure 8:
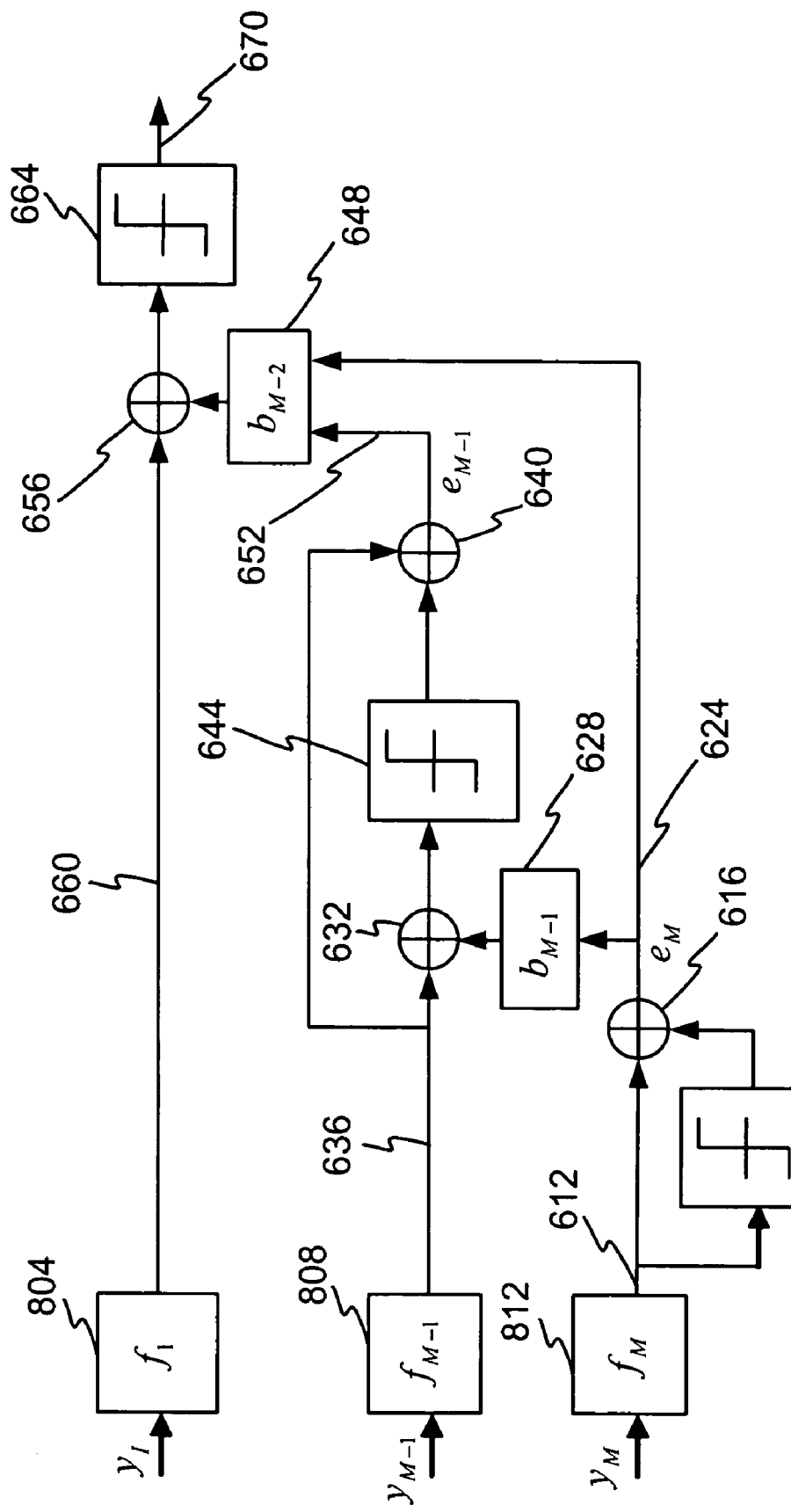
FIG. 8 illustrates a block diagram of an alternative embodiment of the MIMO processing module as shown in FIG. 6.

FIG. 8 illustrates a block diagram of an example embodiment of the MIMO processing module with the matrix F simplified to a diagonal matrix. Again, it is contemplated that this processing may be expanded to any number of channels. In FIG. 8, the processing may be expanded to M number of channels. In the example embodiment the individual matrixes $f_1, \ldots, f_{M-1}, f_M$ represent complex scalars that may operate on the phase and magnitude of the incoming signals $y_1, \ldots, y_{M-1}, y_M$. This embodiment enjoys the advantage of reduced implementation complexity and can maintain similar performance for the situations where the FEXT impairments can be ignored or tolerated. For example, for certain operating environments the transmitter and the remote receiver may be several thousands of feet apart and hence the FEXT induced impairments are attenuated to negligible levels due to the distance between the transmitter and the receiver. The scalar values are thus selected to account for the effect on the signal from the channel, which may distort the phase and magnitude of the signal.

As shown, diagonalized matrix $f_1$ 804, ... $f_{M-1}$ 808 and $f_M$ 812 are shown as receiving the inputs from the M number of channels. After processing by the filters $f_1$ 804, ... $f_{M-1}$ 808 and $f_M$ 812, the resulting signals are provided to the decision directed structure as shown, which has been described above in conjunction with FIG. 6. The term diagonal matrix or diagonalized matrix is generally understood by one of ordinary skill in the art. The benefits gained by a diagonalized matrix include, but are not limited to, reduction in complexity, faster processing capability, and a potential lower cost implementation.

Figure 9:
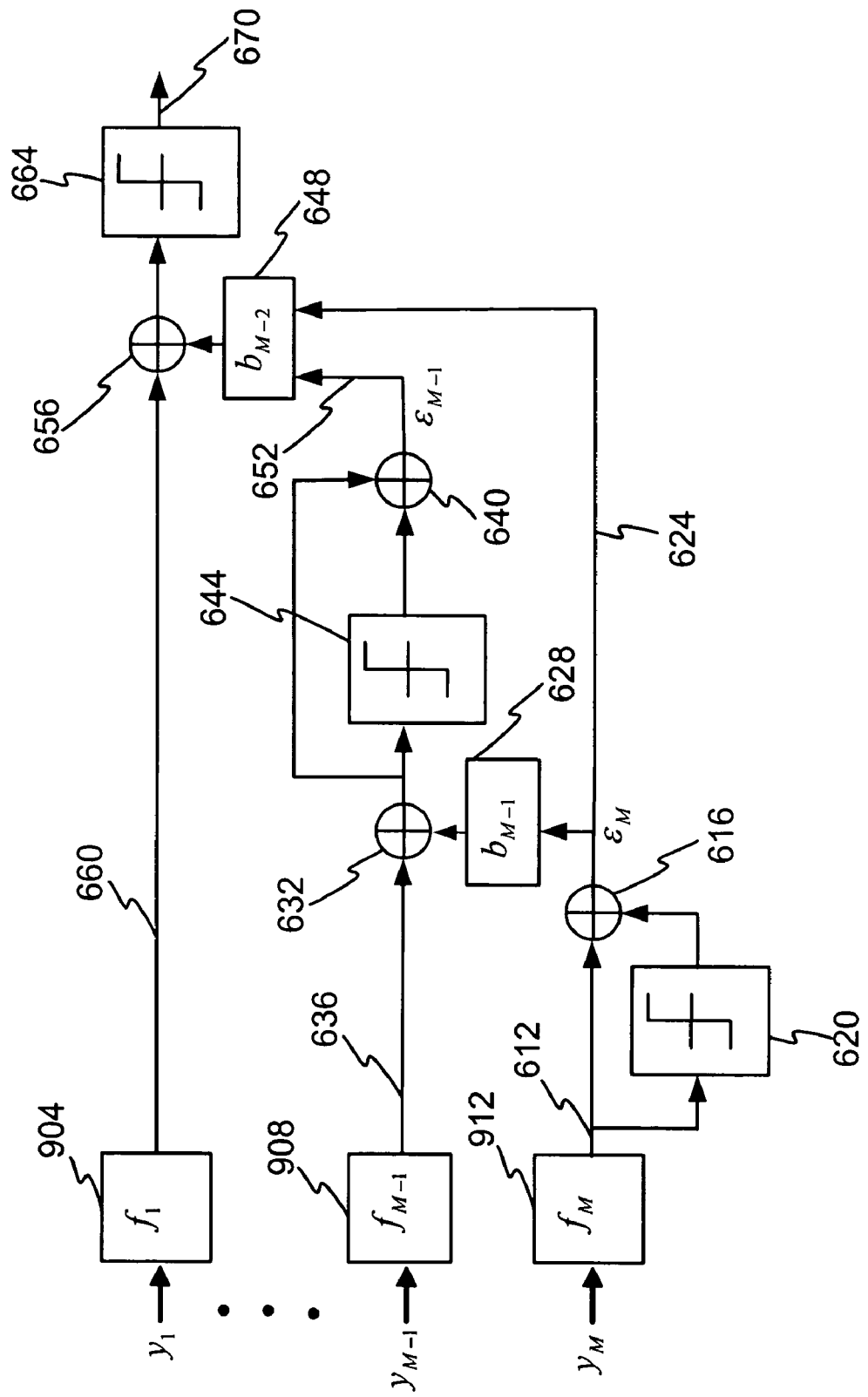
FIG. 9 illustrates a block diagram of an alternative embodiment of the MIMO processing module as shown in FIG. 6.

FIG. 9 illustrates a block diagram of an example embodiment of the MIMO processing module shown in FIG. 7, with the matrix simplified to a diagonal matrix as shown in FIG. 8. This embodiment enjoys the advantage of the embodiment shown in FIG. 7 such as for example, a reduction in the implementation complexity as compared to the embodiment of FIG. 8, yet can maintain similar performance for the situations where the FEXT impairments are substantially smaller than the NEXT impairments or in which FEXT impairments may be ignored. As shown, diagonal matrix $f'_1$ 904, ... $f_{M-1}$ 908 and $f_M$ 912 are shown as receiving the inputs and providing outputs to the structure as shown, which has been described above in conjunction with FIGS. 7 and 8.

It is contemplated that with regard to the post Matrix F or scalar f processing of FIGS. 6 and 8 may be referred to as a non-compensated error processing configuration since the signals feed forward to the junctions are not compensated by the processing from the previous channel. In contrast, the embodiments shown in FIGS. 7 and 9 may be referred to as compensated error processing because the signals feed forward to the junctions are the signals that have had the error signal from the previous channel subtracted out or removed. Compensated error processing has the advantage of subsequent filter processing occurring on signals that have gained the benefit of noise or coupling cancellation.

It is further contemplated that the matrix F may comprise other than a full M×M matrix, or a scalar multiplier f, if it is determined that a only certain coupling components must be canceled. Thus, zero values may fill a portion of a matrix F to simplify operation but there may be non-zero values within the matrix, hence the matrix is not a full diagonal matrix. This may be referred to as a partial diagonal matrix or a semi-diagonalized matrix.

Figure 10:
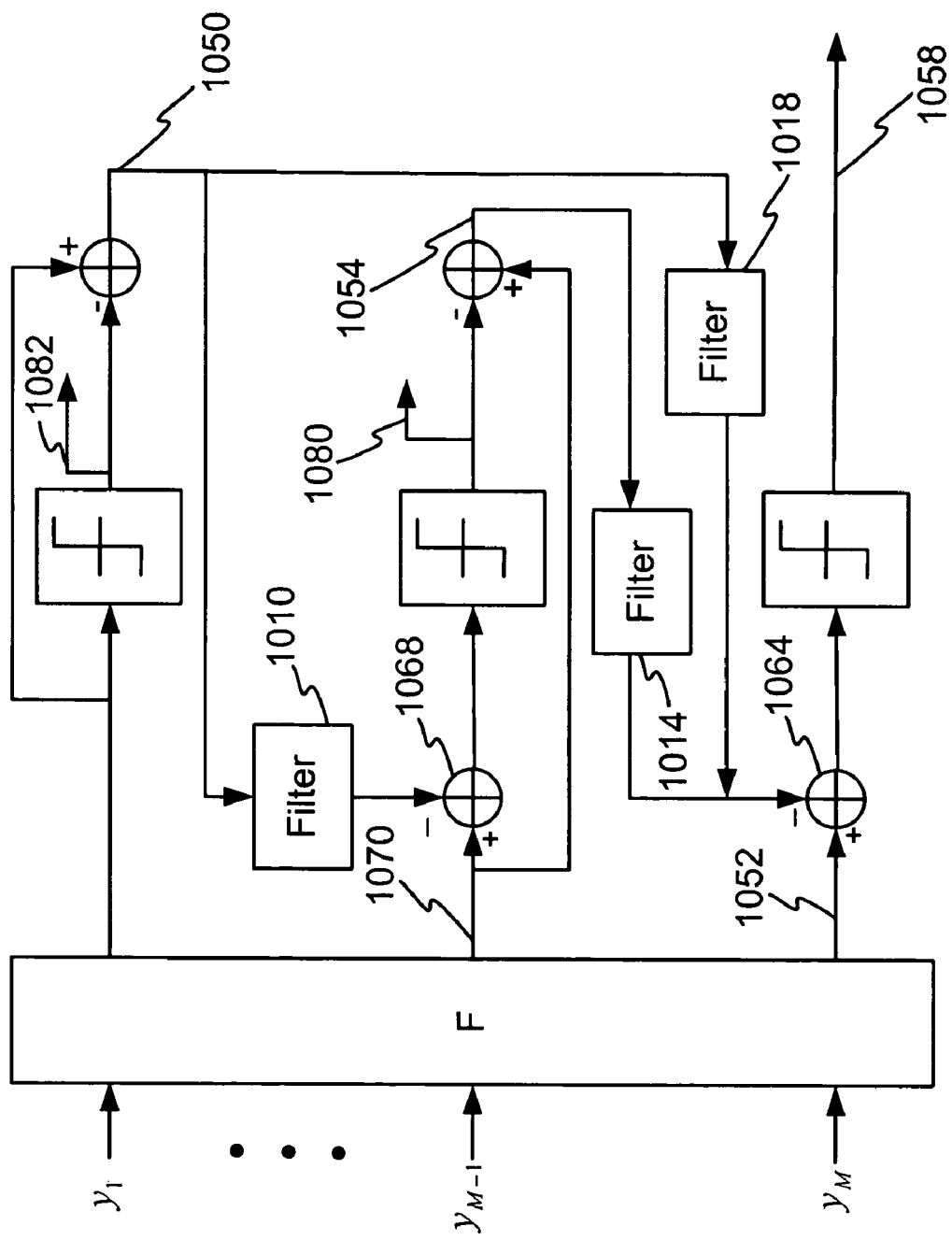
FIG. 10 illustrates a block diagram of an alternative embodiment of the MIMO processing module as shown in FIG. 6.

FIG. 10 illustrates a block diagram of an alternative embodiment of the MIMO processing module. The embodiment of FIG. 10 is generally similar to the embodiment shown in FIG. 6 but the order of the progress through the M channels is reversed. In addition, in this embodiment the paths 1050, 1054 carry a noise or coupling signal that is provided to a filter 1010, 1014, 1018 and each filter is individually tailored to processes the received signal to generate a cancellation signal. In particular, the signal on path 1050 is provided to the filter 1010 which comprises a filter configured to process the noise on channel $y_1$ to generate a cancellation signal tailored to cancel the coupling from channel $y_1$ onto channel $Y_{M-1}$. The filter 1014 processes the signal being provided on path 1054 to generate a cancellation signal for channel $y_M$ while the filter 1018 processes the signal from path 1050, i.e. the channel $y_1$ noise signal, to create a cancellation signal for channel $y_M$. In this embodiment each filter 1010, 1014, 1018 is adapted to modify the cascaded signal as necessary to achieve the processing as described herein. Junctions 1068, 1064 operate as described above to combine or subtract the various signals as shown.

The embodiment shown in FIG. 10 has the advantage of reducing the complexity of filters 1010, 1014, 1018, each of which may be tailored to the particular noise cancellation requirements of a particular channel. In one embodiment the filters comprise single tap filters configured to multiply an input by a scalar or complex number. In one embodiment these filters are FIR type filters and may be embodied in hardware, software, or a combination of both. In one embodiment the filters are configured to reduce correlated noise between channels. Stated another way, the filters may exploit the predictability in noise between lines. The outputs 1058, 1080, 1082 of the slicers comprises the outputs of the MIMO processing system and hence it is the noise terms that are provided to the filters 1010, 1014, 1018.

In operation and with regard to the embodiments shown in FIG. 6-10, the filter matrix F may be configured as a feed-forward device such that matrix values F are arrived at which invert the channel matrix. This may result in a matrix F that accounts for the effects of the self NEXT coupling and the phase and magnitude distortion of the channel on the two or more signal passing through the two or more channels.

As can be shown mathematically, for every matrix, there exists another inverse matrix, that when multiplied using matrix multiplication, results in a diagonalized unitary matrix, that is a matrix having all zero value but for one values in the diagonal of the matrix. Conceptually, the zero values in the matrix locations other than the matrix diagonal represent the cancellation of coupling onto the received signals and the one values in matrix diagonal represent a restoration of the transmitted signal at the receiver through combination of the channel and the filter matrix yielding a unity value.

In one embodiment the least mean square algorithm may be used to adapt or train the matrix values. In other embodiments other forms of training or adaptation may occur.

It is noted that the output of the matrix F may contain unwanted noise in the form of alien FEXT and alien NEXT. The processing that occurs after the matrix filter F includes generation of an error term by the one or more junctions. It is this error term that is processed by one or more filters to generate one or more cancellation signals, which are in turn fed back into the proceeding channels. For example, and in reference to FIG. 10, the error term on output 1050 is processed by the filter 1010 and combined, in junction 1068 with the signal from the matrix filter F on path 1070 on channel $y_{M-1}$. This process repeats through-out the cascade of the various channels 1 through M so that the signals below or above the line of interest are processed to generate a cancellation signal for the line of interest.

To account for and deal with the noise, the feedback filter components, shown as the processing elements subsequent to the matrix F, are configured to remove the unwanted alien type noise. The two or more slicers operate to estimate the transmitted data values which are output from the MIMO processing block. In this manner the transmitted signal may be recovered.

The junctions isolate the noise by subtracting the slicer output from the matrix filter (F or f) output. This noise signal is processed by the filters b to generate a noise cancellation signal, which is in turn combined with or subtracted from subsequent channels in the manner shown in the figures to consecutively remove the unwanted error terms from the signal. As a result, the last channel processed may operate at the highest data transmit rate. In contrast, the first channel, which does not enjoy the benefits of such processing may operate at a lower rate. In one embodiment it is assumed there is no correlation between the noise on each channel. In one embodiment correlation exists in the noise between channels.

In one example environment of use, the method and apparatus disclosed herein is utilized in a multi-channel communication system based on a DSL communication standard. In one such embodiment a discrete multi-tone transmission (DMT) scheme is utilized to allocate channel bandwidth and overcome processing challenges created by ISI (intersymbol interference). It is contemplated that the DMT type processing may be utilized in the multi-channel communication system to increase transmit rates and reduce computational complexity. In one embodiment DMT is utilized with a fourteen channel communication system configured to utilize the processing described herein. In other embodiments mapping schemes other than DMT may be utilized. In other embodiments any number of channels may be utilized. It is contemplated that through the use of multiple channels in conjunction with the processing as described herein overall transmission speeds may be greatly increased over systems that simply multiplex two or more channels to increase the effective bit transmit rate. Another embodiment utilizes fourteen channels although any number of channels may be used.

In one embodiment the method and apparatus described herein operates on each frequency bin or on each of 256 different tones. Thus, the processing and structure discussed herein may be associated with a particular channel and each channel may process the data allocated to each tone. Thus, in one embodiment 256 tones or frequency bins are utilized such that data may be transmitted in each of the frequency bins. The system described here would then operate on each frequency bin to recover the signal and hence eventually the transmitted data. In other embodiments a different number of tones may be utilized. While it is contemplated that time domain filters may be utilized for processing in the time domain, in the embodiment described herein processing may occur in the frequency domain.

Figure 11:
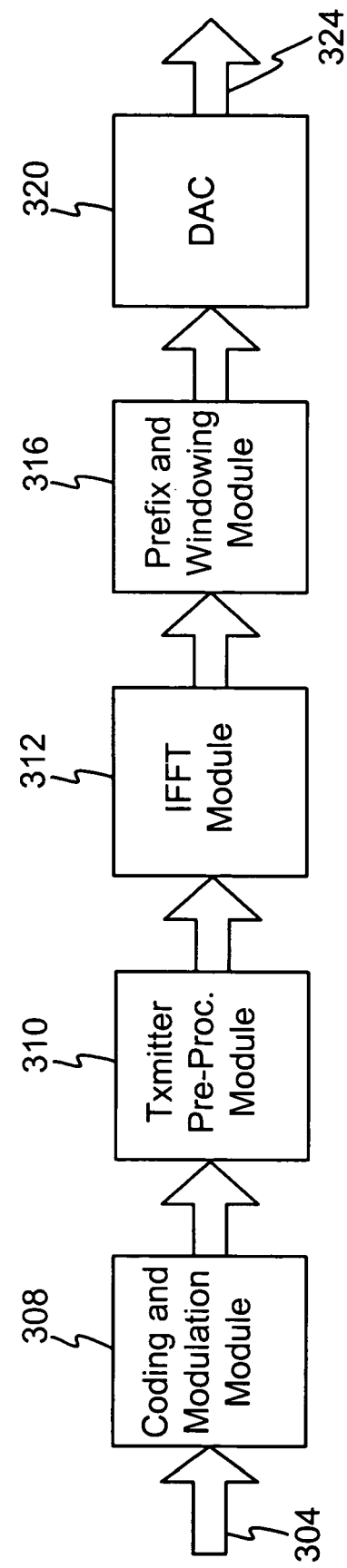
FIG. 11 illustrates an example embodiment of a transmitter having pre-processing capabilities.

FIG. 11 illustrates an example embodiment of a transmitter having pre-processing capabilities. As FIG. 11 shares numerous similarities with FIG. 3, only the aspects that differ from FIG. 3 are discussed herein. As described above, it is contemplated that pre-transmit processing may occur on the two or more signals prior to transmission to pre-cancel the effects of the channel or self FEXT, or both, that will occur during transmission. As such, a transmitter pre-processing module 310 is provided to perform processing on the output of the coding and modulation module 308. The output of the transmitter pre-processing module 310 feeds into or is eventually processed by the IFFT module 312.

In one embodiment the transmitter pre-processing module 310 comprises one or more matrix filters, such as for example the matrix filter F shown as element 608 in FIG. 6. When utilized in the pre-processing module 310 the matrix filter F may be configured as a diagonal matrix or a non-diagonal matrix. In other embodiments, the transmitter pre-processing module may comprise a different type of processing or filtering structure. Since the matrix filter F is described above in conjunction with the description of FIGS. 6, 7, 8, and 9, it is not described again.

In operation, the output of the coding and modulation module 308, which comprises two or more signals, is received and processed by the pre-processing module 310 to modify or change the two or more signals in a manner that, after passage through the channel results in the two or more signals provided from the coding and modulation module 308, or two or more signals that are similar thereto. In one embodiment the pre-processing module may be considered as pre-coding or pre-transmit filtering to filter the signal in anticipation of the effect, of the channel, on the signal. After processing by the transmit pre-processing module the two or more signals are provided to the IFFT module 312.

It is contemplated that training, adaptation, or both may occur on the coefficients, tap values, or matrix values to tailor the performance of any of the filters described herein to the particular needs of the system and to maintain performance. In one embodiment the adaptation occurs in real time or periodically to maintain system performance and thereby adjust to changes in temperature, coupling, or other factors. In the case of the pre-processing module 310 (FIG. 11), the coefficients, tap values, or matrix values may be calculated by the receiver during a training or adaptation routine and transmitted back to the transmitter.

In one embodiment it is contemplated that the method and apparatus described above may also be utilized in a communication system configured to communicate an encoded signal. As is understood in the art, coding improves data transmission by providing means to detect and correct errors that originate during transmission or as part of the reception processing the signal. By encoding data prior to transmission, decode processing may be performed on the received signal to detect and correct such errors by exploiting the information redundancy. As a result of the increased error correction capability, data may be transmitted using more complex modulation schemes or simply at a higher rate, thereby desirably increasing the effecting data transmission rate. Examples of coded data schemes include trellis coded modulation, convolutional and block codes, concatenated codes and iterative or turbo codes, or any other type code.

For purposes of this discussion the various types of codes are sub-divided into block codes, convolutional codes, and hybrid codes. Each of these code categories are set forth and separately discussed below. Before moving to an individual discussion of the processing associated with each code category, a general discussion is provided including several block diagrams of example embodiments of communication systems configured to perform joint multiple-input, multiple-output (MIMO) processing and decode processing.

In generally, most all types of encoding share the common characteristic that to generate decoded data at a particular time requires a knowledge of future received symbols. As used herein, the term symbols is defined to mean information in an encoded state that is received over the channel prior to decoding. The term symbol may refer to information encoded based on block coding, convolutional coding, hybrid coding, or any other type of encoding. The term data is defined to mean information resulting from the decoding process.

Since it is necessary to have knowledge about subsequently received symbols to make a final data decision regarding a current symbol, coded systems are often referred to a memory based systems since it is often necessary to store symbols or decoded data in memory until subsequent symbols are received, decoded, and sufficient decision are made to formally decide on a decoder output. For example, when receiving a string of symbol values $S_{t1}, S_{t2}, S_{t3}, S_{t3}, St_{t4}$ the symbol $St_{t4}$ is received later in time as compared to a symbol $S_{t1}$, which is received first. In an encoded system, it may be necessary to receive symbol $St_{t4}$ before the data associated with $S_{t1}$, maybe completely decoded and output. The amount of delay, which may be represented in time, clock cycles, or symbols, is referred to as the decoding delay k.

As encoding and encoding of data is generally understood by one of ordinary skill in the art, this discussion does not focus on coding itself, but instead on the implementation of decoding in a MIMO system. In reference to FIG. 3, it is contemplated that the encoding process, such as any of the types of encoding identified herein or any other type of encoding, may be performed within the coding and modulation module 308 of the transmitter.

Figure 12:
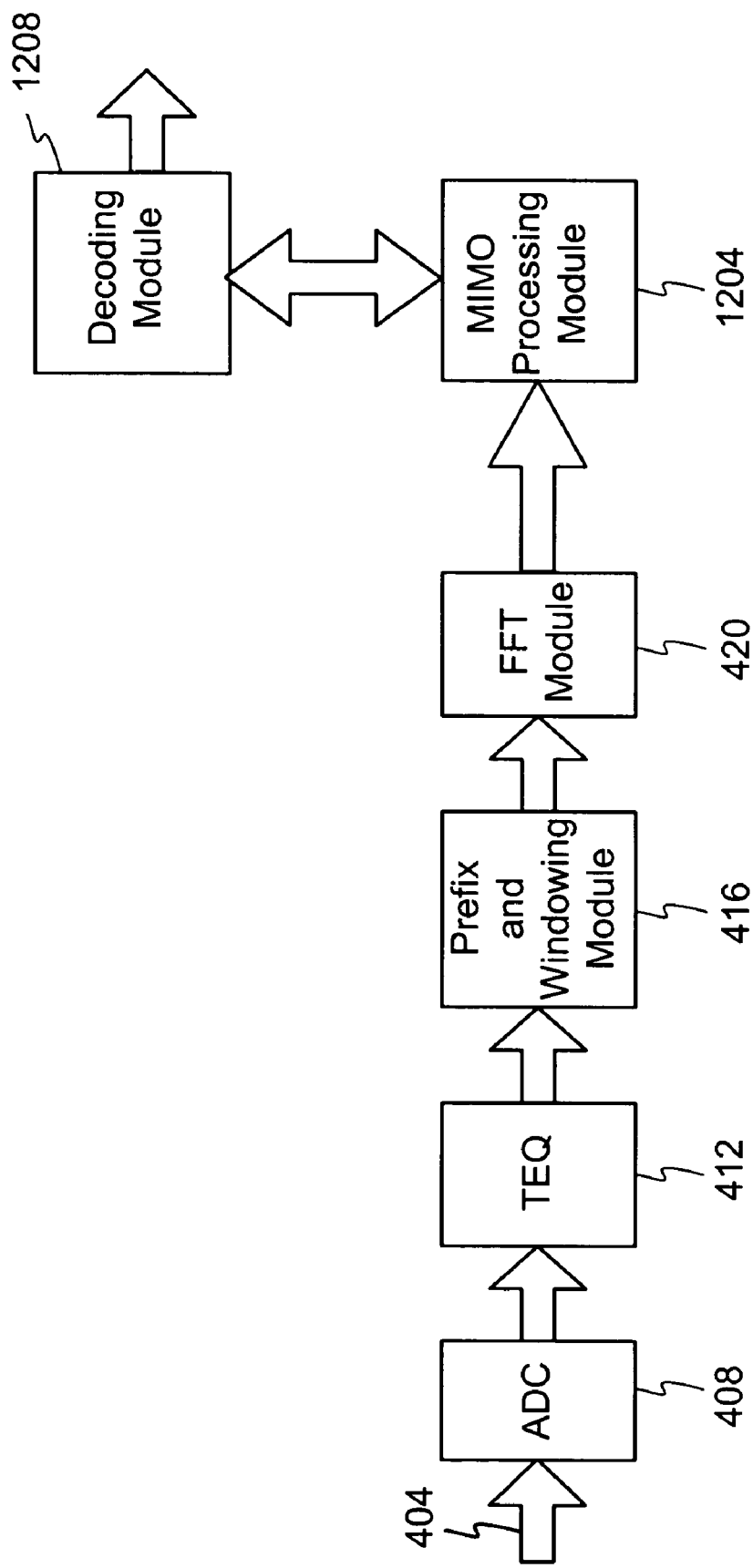
FIG. 12 illustrates a block diagram of an example embodiment of a receiver configured to perform multiple-input, multiple-output processing on an encoded signal.

FIG. 12 illustrates a block diagram of an example embodiment of a receiver configured to perform MIMO type processing on an encoded signal. As elements 404, 408, 412, 416, 416, and 420 have been described above, these elements are not described again. As with prior embodiments it is contemplated that the interconnections, such as input 404, between processing elements comprise two or more channels, where each channel may comprise one or more conductors or signal paths. As shown, the output of the FFT module 420 feeds into the MIMO processing module 1204. The MIMO processing module 1204 provides an input (noise compensated data) to the decoding module 1208 as shown, while the decoding module 1208 is configured to provide the output from the receiver system, shown in FIG. 12, to subsequent hardware or systems. Further, the decoding module 1208 provides decoded symbols back to the MIMO module to assist in noise compensating for subsequent received data. Therefore, the communication between 1208 and 1204 may be bi-directional. In summary, the MIMO processing module 1204, as is described above in greater detail, operates in a sequential manner to process the data through the channel thereby reducing noise or other unwanted interference on subsequently processed channels. Concurrently, the decoding module 1208 performs decode processing on the received symbols to generate data, which has been encoded by the encoding scheme into symbols. As used herein, the term 'subsequent channels' is defined to mean channels not yet processed, such as in the direction of channel 1 in this example embodiment. In contrast the term 'previous channels' is defined to mean channels that have already undergone processing such as channels in the direction of channel M in this example embodiment.

Figure 13:
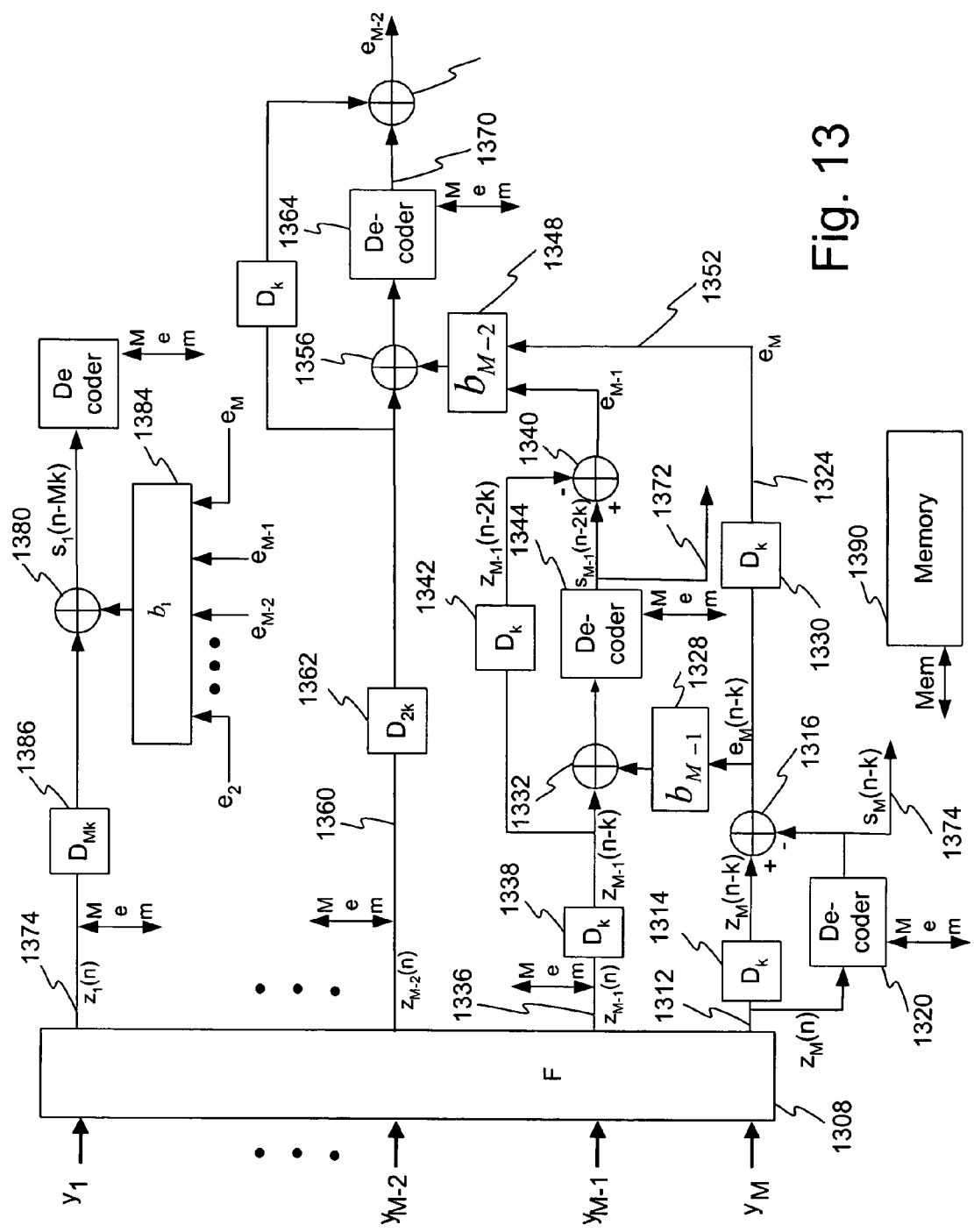
FIG. 13 illustrates a block diagram of an example embodiment of a multiple-input, multiple-output processing system configured to process an encoded signal.

As can be appreciated, the combination of MIMO processing with an encoded communication system created complexities due to the very nature of MIMO processing, which requires processing in a sequential manner to sequentially reduce noise in subsequent channels, and decoding processing, which calculates multiple possible data values based on received symbol and, over time, may backtrack to as to which of the possible data values to output. FIG. 13 aids in understanding the inter-relation between MIMO processing and decoding.

FIG. 13 illustrates a block diagram of an example embodiment of a MIMO processing system configured to operate in conjunction with signal decoding. Various methods of operation are possible with the system shown in FIG. 13. In particular, block decoding operation, convolutional decoding operation, and hybrid decoding operation are discussed separately below, it is contemplated that all of the various encoding methods may be decoded with the system shown in FIG. 13 or a similar system having similar components in a different arrangement. FIG. 13 shares numerous similarities with FIGS. 6 and as described above and as a result the discussion of FIG. 13 should be considered to supplement the previous discussions provided above. FIG. 13 provides a more detailed view of the MIMO processing module 1204 and the decoding module 1208 as shown in FIG. 12.

Inputs carrying signals $y_1, \ldots y_{M-2}, y_{M-1}, y_M$ are considered the channel inputs of a multi-channel communication system processing apparatus. These signals are provided to a filter matrix F 1308. The filter matrix 1308 is described above in detail and hence not described again. The channel M output 1312 from the filter 1308 comprises signal $z_M(n)$ which is provided to a delay 1314 and to a decoder 1320. The decoder 1320 performs decoding on the signal $z_M(n)$ that is dependant on the particular type of encoding implemented at the receiver. As understood by one of ordinary skill in the art, the decoder processing varies from code to code. The delay 1314 comprises any type delay. In general the output of matrix F is a sequence of vectors which may be indexed by time, or frequency or some other means. In this embodiment the delay 1314, and other delays shown within the system of FIG. 13 are utilized to insure proper alignment of the signal sequences when combined or subtracted in the junctions. The decoding processing may introduce a delay into the signal. In this embodiment the delay 1314 introduces an amount of delay k, where k is the decoding delay, to create the signal $Z_M(n-k)$. Consequently the junction 1316 subtracts the delay's output signal from the decoder output to generate an error signal $e_M(n-k)$, which may also be written as in abbreviated form as $e_M$. This is the error signal on channel M and is arrived at after decoding the signal on channel M. This process and the use of the error signal in MIMO processing is described above in conjunction with FIG. 6.

The output of the junction 1316 is received by a filter 1328 and a delay 1330. The filter 1328 is configured, as is describe above in more detail in conjunction with FIG. 6, to modify the error term to generate a signal that cancels unwanted signal components on the subsequent channel, in this embodiment channel M−1. As such, the filter output is provided to junction 1332, which also receives a delayed version of the signal $z_{M-1}(n)$, which is delayed by delay 1338 by an amount k to create a signal $z_{M-1}(n-k)$. The delay output signal $z_{M-1}(n-k)$ is also provided to a delay 1342, which creates a signal $z_{M-1}(n-2k)$. As can be appreciated, each decoding procedure may introduce an amount of delay k, thereby requiring appropriate delay for signals not undergoing decoding.

In this example embodiment, the junction 1332 subtracts the cancellation signal generated by filter 1328 from the delayed channel M−1 signal to create signal having all or a portion of the unwanted noise removed. This resulting signal is provided to a decoder 1344. The output from the decoder 1344 comprises the desired data, which is provided on an output 1372 and to a junction 1340. The junction 1340 subtracts the output from the delay 1342 from the decoded data to generate an error term $e_{M-1}(n-2k)$, which is also identified as $e_{M-1}$. Note that the error term is delayed by an amount 2k for this channel. The decoded data may be stored in memory 1390. The error term(s) may be stored in memory 1390.

The error term $e_{M-1}$ is provided to a filter 1348, which also receives as an input the output of delay 1330 as shown. As can be seen, the filters 1328, 1348 receive error terms from the previous channels to create a cancellation signal for the subsequent signal. The delay 1330 is provided to time or phase align the error terms from channel M. The output of the filter 1348 comprises a signal tailored to cancel noise on channel M−2, based on the noise terms isolated on channel M and M−1, which is to say the previous channels.

As can be seen this process of noise term isolation and subtraction continues in junction 1356. The channel M−2 signal $z_{M-2}(n)$ on line 1360 is delayed by an amount 2k in delay 1362 to create a signal $z_{M-2}(n-k)$. The junction 1356 removes (or combines) the filter output signal from the delay output signal $z_{M-2}(n-k)$ to create a signal having unwanted noise, isolated from channel M and channel M−1, removed. This resulting signal is provided to the decoder 1364 wherein the channel M−2 data is isolated. After decoding, the resulting channel M−2 data is subtracted from the output of the delay 1362 to isolate an error terms $e_M\_2$.

This process continues in cascading manner through the subsequent channels. Delays 1362, 1342, 1338, 1330, 1314 are introduced as shown and as necessary to maintain alignment between signals and processing across channels. For example, it is necessary to delay a non-decoded signal before it is added to or subtracted from a decoded signal to account for the delay k introduced by the decoding process.

As shown, the matrix filter output 1374 provides signal $z_1(n)$ to junction 1380 after being delayed by delay 1386. In one embodiment the delay 1386 introduces a delay comprising Mk. The junction 1380 also receives an input from a filter 1384. Filter 1384 receives the error terms from all the other channels. To aid in understanding, all the interconnection lines have not been shown and it is assumed that proper delays are introduced to account for the processing by the various decoders. For example, a delay 1386 delays the signal $z_1(n)$ by an amount Mk where M is the number of channels and k is the decoding delay. As can be seen, for channel 1, the error terms for all the previous signals are process by the filter 1384 to create a composite cancellation signal that is subtracted (or added depending on filter construction) to remove unwanted noise from the signal on channel 1. The resulting signal $s_1(n-Mk)$ may be provided to a decoder to isolate the channel 1 data.

Memory 1390 is shown as interconnected through out the system of FIG. 13. It is contemplated that memory may be shared, as shown, or interspersed as necessary to interface with the various components and achieve desired operation.

Any type memory may be utilized, including, but not limited to RAM, DRAM, DDRAM, and flash memory. The memory may be configured to store one or more of incoming symbols, decoded data, error terms on any of the channels.

As can be seen by examination of FIG. 13, MIMO processing continues to occur on a channel by channel basis, moving to subsequent channels after isolating a error term. The error terms from previous channels are processed by a uniquely tailored filter to modify the error term(s) to create that cancellation signal that is used to remove or cancel unwanted noise on the subsequent channel. After the unwanted noise is removed, decoding of symbols may occur to obtain the encoded data. This process progresses through the channels. It is contemplated that channels that benefit from the MIMO processing will have a greater data transmit rate channels. Hence, channel 1 can be configured to have a greater effective data transmit rate than channel M due to the MIMO noise cancellation.

In an alternative embodiment, one or more encoders are shared between channels. This may reduce the requirements for hardware, software, or both since a fewer number of decoders are provided than there are channels. Hence, a single decoder, or more than one decoder, may be shared between channels utilizing a switch, switch matrix, or other routing system such as control logic. Similarly, the one or more filters may be shared and simply reconfigured with appropriate coefficients to be shared between channels.

Block Codes

On exemplary class or category of coding comprises block codes. Block codes comprise a coding scheme wherein an encoder processes a number of bits or symbols, i.e. a block of data or symbols, to generate an encoded block of symbols. The encoding operates such that when the encoded block is decoded, there exists a limited number, and preferably unique set of decoded symbols or decoded data that corresponds to the encoded block. By comparing the actual decoded data to the set of possible data values, errors may be detected and corrected during decoding. The data to be transmitted is continually grouped in to blocks, encoded, and transmitted in encoded form. Modulation may also occur. The encoded block of symbols or encoded values is transmitted over the one or more channels and upon receipt is decoded to restore the original data. Encoding may be limited on per channel basis. Errors occurring during transmission and instances of confusion during decoding as to the data value(s) represented by an encoded symbol value or block will be revealed and corrected during the decoding process. It should be noted that in one embodiment the decode operation occurs on blocks of encoded symbols wherein the decode operation of one block is completed before beginning the decode operation on the next block. As a result of the encoding/decoding operation, data may be transmitted and received with a lower error rate, or transmitted at a higher effective rate.

Figure 14:
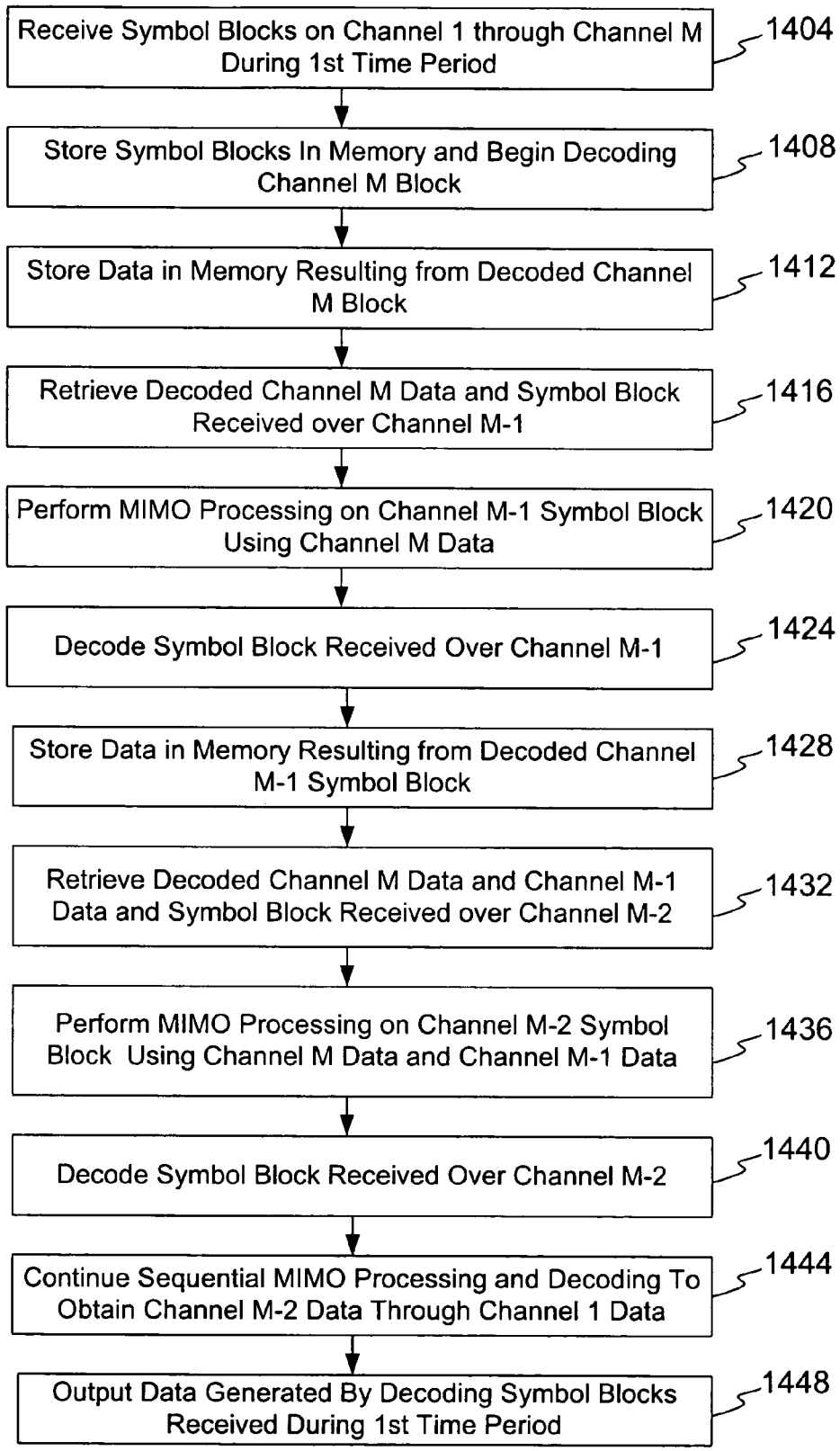
FIG. 14 illustrates an operational flow diagram of an example method of multiple-input, multiple-output processing and decoding of a block coded signal received over a multi-channel communication system.

FIG. 14 illustrates an operational flow diagram of an example method of MIMO processing and decoding on a block coded signal received over a multi-channel communication system. This is but one exemplary method of operation and it is contemplated that other methods may be enabled without departing from the scope of the invention. At a step 1404, the MIMO processing module and decoding module (hereinafter block MD system) receives a first set of symbol blocks on channel 1 through channel M during a first time period. The first time period is defined as the time period during which the first set of blocks is on each channel. In one embodiment an encoded block is transmitted over each channel of the multi-channel communication system. In other embodiment other methods or arrangements for transmitting one or more encoded blocks over the one or more channels are utilized.

At a step 1408 the block MD system stores the symbol blocks, received over each channel, in a memory or other storage means, and begins decoding the block received over channel M (see FIG. 13 for channel references). Decoding occurs and may have to be completed on channel M before beginning decoding on the other channels so that the errors terms for channel M may be generated. Accordingly at a step 1412, the block MD system stores the data, resulting from the decoding operation, in memory. In one embodiment it is stored in memory so that it may be output in unison with the other data from the other channels. In one embodiment it is stored in memory so that it may used to generate error terms for the other subsequent channels. It is contemplated that the error terms associated with each channel may be stored in memory or calculated when needed during subsequent MIMO processing for each channel.

To perform MIMO processing the error terms are also generated and stored in memory. Generation of the error terms may be considered to be part of the MIMO processing. Thus, at a step 1416 the block MD system retrieves from memory the decoded channel M data and the symbol blocks received over channel M−1 and, at step 1420, the block MD system performs MIMO processing on the channel M−1 symbols block using the channel M data, and in particular the channel M error terms. It is contemplated that this process may also include filtering the one or more error terms to generate a cancellation signal.

After the processing of step 1420, the operation advances to step 1424 wherein the decoder associated with channel M−1 decodes the symbol block received over channel M−1. This process yields the channel M−1 data. At a step 1428, the block MD system stores the channel M−1 data in memory. The data may be output at a later time and used during subsequent processing.

At a step 1432 block MD system retrieves the decoded channel M data and channel M−1 data from memory. Alternatively, the error terms associated with each of these channels may be received instead of the data since the error terms are filted to create a cancellation signal. Also occurring at step 1432 the symbol block received over channel M−2 is received. Using the information obtained from memory at step 1432, the operation performs MIMO processing on the channel M−2 symbol block. This occurs at step 1436. As described above in conjunction with FIG. 6 the MIMO processing utilizes the noise or error terms from previous channels to cancel unwanted noise on the channel of interest.

At a step 1440 the decoder associated with channel 2 of block MD system decodes the symbol block received over channel M−2. This generates channel M−2 data. At step 1440 the above-described process repeats for channel M−2 and the other remaining subsequent channels up to and including channel 1. Hence, the channel M−2 data generated during decoding is stored in memory, the error term isolated as part of subsequent MIMO processing for channel M−3 and decoding occurs on channel M−3.

Eventually, after the sequential MIMO processing the operation arrives at step 1448 wherein the data generated as a result of the decoding operation associated with each channel is output. It is contemplated that the data associated with each channel may be stored and output across the channel at the same time, or the data may be output right after decoding and not stored in memory. If the data is not stored, then the data may be output upon being decoded. For example, this delays associated with MIMO processing and decoding may be anticipated prior to transmission and accounted for during the encoding operation or transmit operation to thereby allow the data to be synchronized even when output from the MIMO/decoder module immediately after decoding.

As can be appreciated based on the forgoing discussion, the MIMO processing occurs sequentially from channel M to channel 1. The noise cancellation increases with each sequential channel processed, such that the final channel, in the example discussed herein, channel 1, gains the benefit of cancellation from the filtered error terms from all the other previous channels. Concurrently, decoding of a block encoded signals occurs on a channel by channel basis. Inherent in block codes, is a decoding delay k, which is a delay associated with the time between the beginning of receipt of a block of symbols and completion of the decoding of the block. Because of the sequential nature of MIMO processing and the delay associated with block decoding, memory is utilized to store data and or error terms to facilitate processing by subsequent channels.

Figure 15:
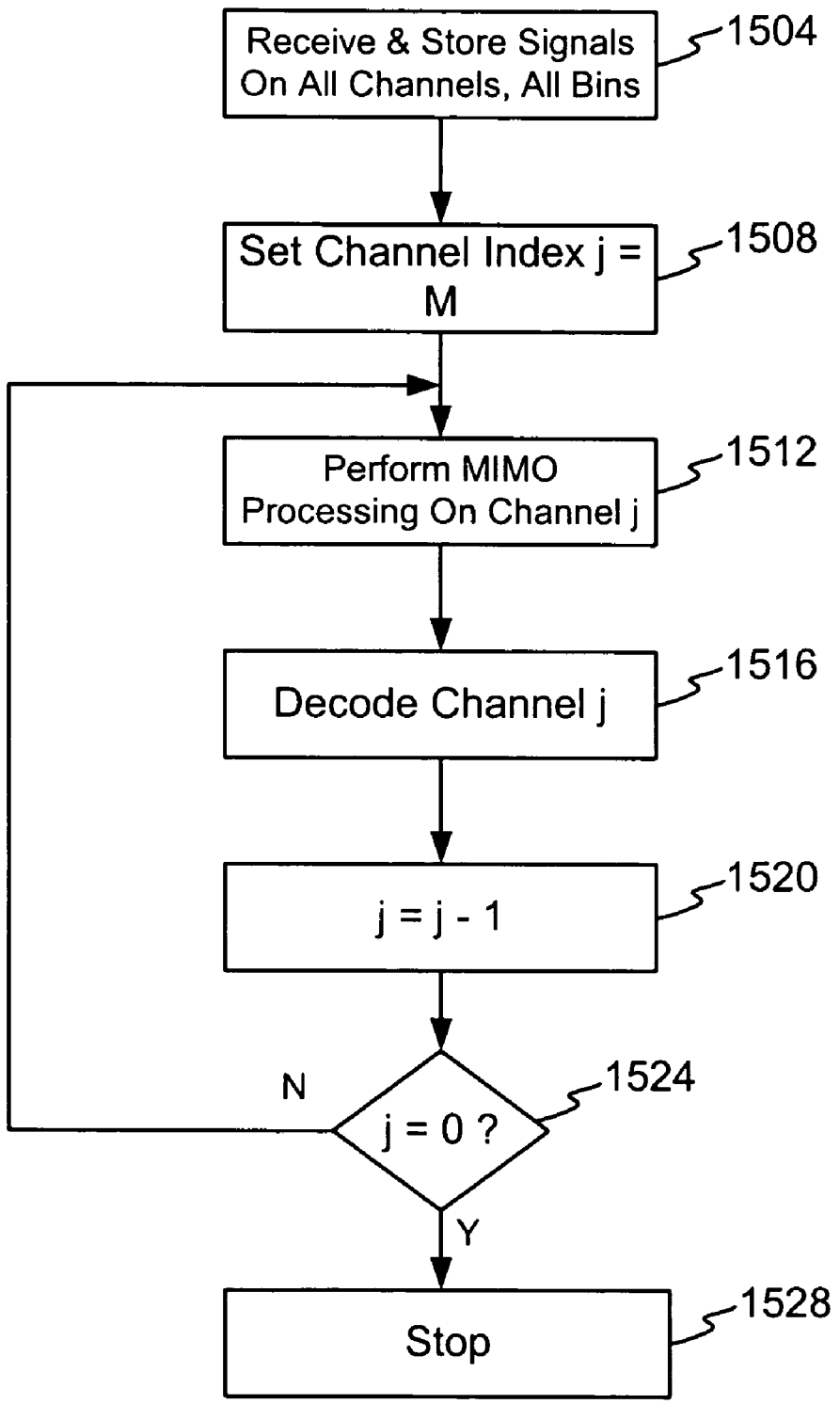
FIG. 15 illustrates an operational flow diagram of an example method of channel indexing during block multiple-input, multiple-output processing and decoding.

FIG. 15 illustrates an operational flow diagram of an example method of channel indexing during block MIMO processing and decoding. This is but one example method of indexing and hence other methods are contemplated. This exemplary method may be utilized by a controller, logic controller, or other device configured to oversee operation and/or progress of the MIMO operation between channels, such as after decoding is complete on a channel.

Turning now to FIG. 15, at a step 1504 the operation receives and stores the blocks received over all the channels and over all bins. Then, at a step 1508, the operation sets the channel index j equal to M. The channel counter index j is used to represent a counter variable, representative of a channel undergoing processing or that has completed processing. At step 1512, the system performs MIMO processing on channel j. Thereafter, at step 1516, the system decodes the symbol block received over channel j. After decoding and MIMO processing and decoding, the channel counter variable j is reduced by one. This occurs at step 1520 and at decision step 1524 a determination is made regarding whether j equal zero. If j is not equal to zero, then the operation returns to step 1512. In contrast, if j equal zero, then the operation advances to step 1528 and the operation stops. Additional encoded blocks may be received, processed, and decoded in this manner.

Convolutional Encoding

In contrast to block coding, which operates on discrete blocks of data, convolutional encoding operates on a continuous stream of a data. The encoded data is transmitted and received at a receiver for decoding. During a traditional convolutional decode processing, a decoder associated with a channel receives a continuous stream of encoded symbols and processes these encoded symbols on a continuous basis, thereby yielding a stream of data. There is a delay associated with the decoding, such that receipt of the encoded first symbol at the decoder does not immediate yield data associated with the decoded first symbol. Instead there is a decoding delay k that requires additional symbols to be received and processed. The decoding of additional symbols narrows the possible correct decoding decisions of the first symbol until, a sufficient number of additional symbols are received and decoded to make a final decision regarding the proper decoding decision for the first symbol. Hence, it should be noted that there is a decoding delay k associated with convolutional decoding that represents the additional symbols that must be received and processed before a final decision may be made. Examples of convolutional codes include trellis coded modulation and some turbo coded modulation. Turbo codes or turbo coded modulation may be implemented using block or convolutional codes or a combination of the two.

Incorporating convolutional decoding in a MIMO processing system requires adaptation of the MIMO processing to account for the decoding delay. Thus in summary of one embodiment, the decoding process for a particular symbol of a particular channel must be completed before the error term may be isolated for that particular symbol of that particular channel. Upon calculation of the error term, MIMO processing may occur to reduce or eliminate unwanted noise on one or more subsequent channels. After noise reduction, decoding may then occur on the subsequent channel. As a result, MIMO processing and decoding occur in a sequential manner through the channels.

A memory may is used to store incoming encoded symbols and such symbols must be stored until the MIMO processing and decoding progresses through the channels, at which point the encoded is recalled from memory and decoded. The following figure illustrates this process in more detail.

Figure 16A:
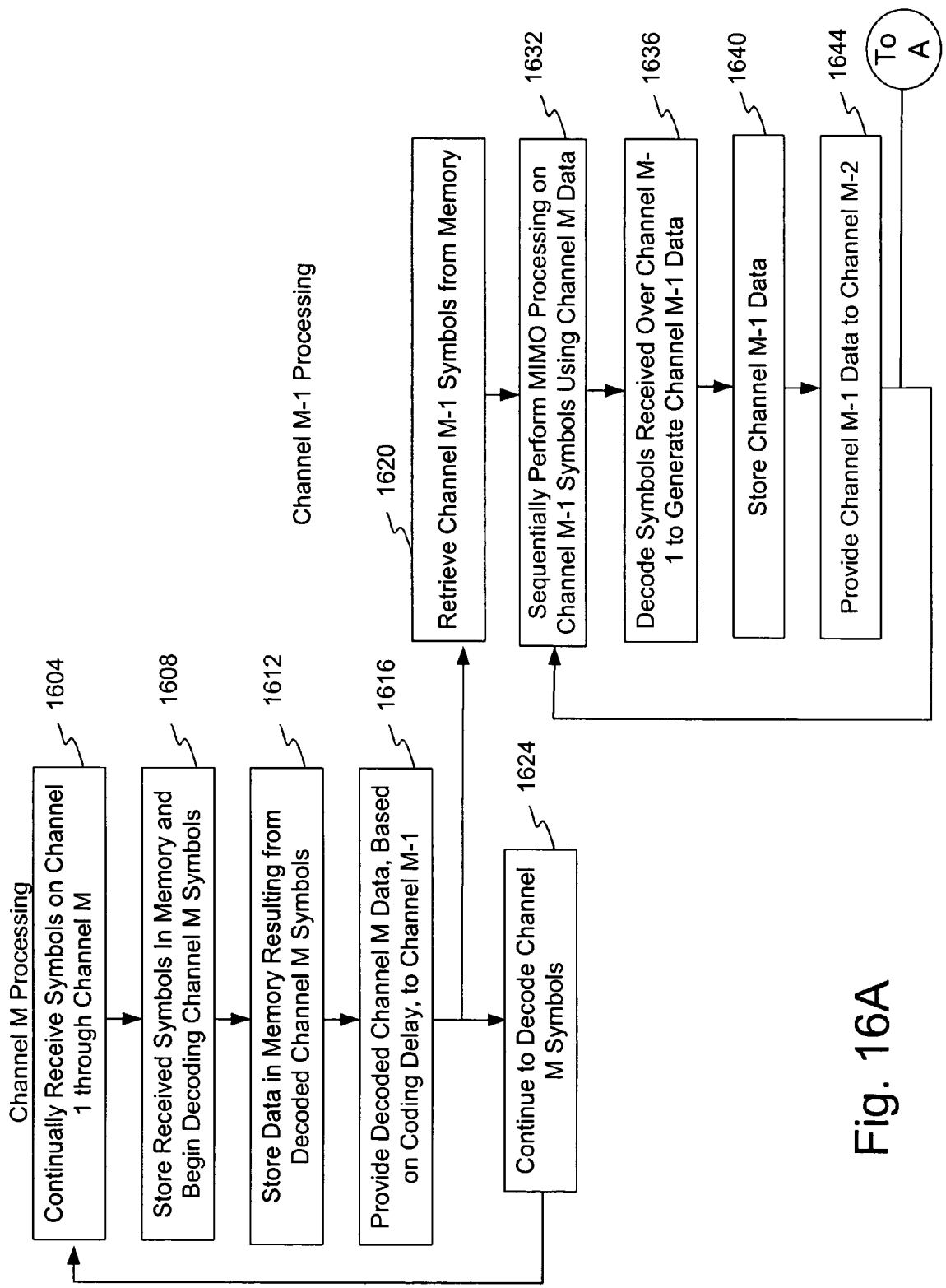

FIG. 16A illustrates an operational flow diagram of an example method of MIMO processing and decoding on a convolutional encoded signal. This is but one possible method for MIMO processing on a convolutional encoded signal and it is contemplated that other methods exist or may be developed that do not depart from the scope of the claims. At a step 1604 a MIMO processing module and convolutional decoder system (hereinafter convolutional MD system) continually receives encoded symbols on channel 1 through channel M. As it is contemplated that the symbols are continually sent to maximize the transmit rate, at a step 1608 the convolutional MD system stores the received symbols in a memory and begins decoding the symbols received over channel M. It is contemplated that there is a decoding delay defined by a value k that occurs between the start of the decoding of a particular encoded symbol and output from the encoder of data resulting from or associated with that particular symbol.

At a step 1612, the convolutional MD system stores the data in a memory or may optionally output the data directly after decoding. If stored, the data from all channels may be output in synchronized fashion, such as in the manner received. The data may also be, at a step 1616, provided to channel M−1 for MIMO processing. At a step 1624 the operation continues to decode the continually arriving channel M systems as shown by the return to step 1604. As can be appreciate the coded symbols are continually arriving and hence the convolutional decoder associated with channel M continually decodes the incoming symbols and outputs decoded data, after a decoding delay k. The amount of decoding delay k may vary or be fixed depending on the design of the system. This describes the processing associated with channel M Turning now to the processing associated with channel M−1, at a step 1620, the processing systems associated with channel M−1 retrieves the symbols received over channel M from memory and at a step 1632 sequentially performs MIMO processing on the channel M−1 symbols using the channel M data. This may comprise isolating an error term associated with channel M and filtering this error term to generate a noise cancellation signal. The noise cancellation signal may be combined with, such as subtracted from, the channel M−1 symbols to remove unwanted noise from the M−1 symbols. This improves the accuracy of the decode operation for channel M−1.

After MIMO processing, the operation advances to step 1636 wherein the convolutional MD system begins decoding the symbols received over channel M–1 to thereby generate channel M–1 data. As with channel M, there is a decoding delay k. At step 1640 the channel M–1 system stores the channel M–1 data in memory or any other storage location. Alternatively for any of the channels, the data may be immediately output and error terms calculated and stored in memory. At a step 1644 the channel M–1 system provides the data, or the error terms to channel M–2 for MIMO processing and as shown, the operation returns to step 1632 for continuous processing of incoming encoded symbols.

After the initial delay associated with the decoding delay and any delay from MIMO processing on channel M, processing on channel M–1 is able to operate continuously as it is contemplated that there is a continuously available stream of data or error terms from channel M, the previous channel, to allow for continuous MIMO processing and decoding on channel M–1. The operation branches at identifier A to FIG. 16B.

FIG. 16B illustrates a continuation of FIG. 16A, showing the operational flow diagram of an example method of MIMO processing on a convolutional encoded signal. Working from identifier A, the processing associated with channel M–2 is shown. At a step 1650 the convolutional MD system retrieves the stored channel M–2 symbols from memory and the data, or error terms, from the previous channels for MIMO processing. It is contemplated that the symbols received over channel M–2 are stored until the channel M and channel M–1 processing and decoding is complete so that MIMO processing may occur on channel M–2 to thereby reduce unwanted noise and improve performance. MIMO processing for channel M–2 may utilize the error terms from both channel M and channel M–2. Thus, at a step 1654, the operation sequentially performs MIMO processing on channel M–2 symbols using the error terms (or data) from channel M and channel M–1. As described above, this processing reduces unwanted noise from the signal received over channel M–2.

At a step 1658 the operation decodes the symbols received over channel M–2, after MIMO processing, to generate or restore the data associated with channel M–2. After decoding, the data, or error terms, may be stored in a memory. This occurs at a step 1662. This process for channel M–2 repeats by returning to step 1654. In addition, the operation advances to step 1668 wherein the operation described above continue sequentially through the subsequent channels using the data or error terms isolated on previous channels to reduce noise on a channel being processed. MIMO processing and decoding occur on subsequent channels. It is contemplated that at step 1672 that the operation will periodically or continually monitor for an end of trellis control symbol(s).

In this manner the encoded data may be transmitted over the numerous channels of the multi-channel communication system and upon reception, subject to MIMO processing and decoding. As can be appreciated there is a decoding delay k associated with decoding and MIMO processing occurs sequentially through the channels. Incoming symbols are stored and hence await processing until completion of decoding and MIMO processing previous channels as described herein.

Hybrid Encoding

In addition to encoding schemes which may be categorizes as block coding or convolutional encoding, it is contemplated that a hybrid category of coding may exist or be developed. In one embodiment hybrid encoding comprises a combination of both block coding and convolutional encoding to create a type of encoding that has shared characteristics of both types encoding. Example of hybrid codes comprise, but are not limited to, encoding schemes that transmit trellis coded data in blocks, or in fixed durations or amounts of trellis coded data, block encoded data that is sent continuously but subdivided or blocked prior to transmission or after reception, or any other code that is a combination of other types of coding schemes. In another example, it is contemplated that a trellis code may be implemented in a DMT environment, yet terminated at the end of each group of frequencies or bins. In one example embodiment, using 256 DMT tones, the trellis code is run across the 256 tones and then terminated. The process is repeated during the next 'block' of trellis encoded tones. It is further contemplated that termination may occur at any location in the 'block' of tones.

It is further contemplated and the claims are indented to cover, instances when encoding is constrained on a per channel basis, or in implementations when encoding occurs across channels. Accordingly, decoding may occur on a per channel basis wherein a decoder operates on only symbols received over a particular channel, or a stream of encoded data is spanned across several channels.

It is further contemplated that not all of the channels be encoded. Hence in one example embodiment, only the first few or first half of the channels are encoded. This may reduce the overall processing delay, since there is no decoding delay associated with the uncoded channels. Additionally, selective coding of signals on particular channels may provide the benefit of increasing the overall transmit rate while still reducing the error rate on selected channels. For example, the first few channels processed and decoded benefit from MIMO processing the least, and thus coding may be an ideal solution for these channels.

While various embodiments of the invention have been described, it will be apparent to those of ordinary skill in the art that many more embodiments and implementations are possible that are within the scope of this invention.

What is claimed is:

1. A method for filtering encoded signals received over a first channel through an Mth channel carrying a first encoded signal through an Mth encoded signals that are received over two or more primary channels in a multichannel communication system comprising:
    receiving the first through Mth encoded signals over two or more primary channels, the two or more primary channels adjacent at least one alien channel;
    providing the first through Mth encoded signals to a matrix filter, the matrix filter configured with a transfer function that is the inverse of the two or more channels to thereby cancel at least a portion of unwanted coupling onto the two or more primary channels from the primary channels and to reverse the effects of the channel on the first through Mth encoded signals;
    processing the first through Mth encoded signals within the matrix filter to generate a first through an Mth encoded matrix filtered signals;
    storing at least one of the first through Mth encoded matrix filtered signals in a memory;
    decoding the Mth encoded matrix filtered signal to generate Mth channel data;
    processing the Mth channel data to isolate an error term associated with the Mth channel data;
    filtering the error term to generate at least one noise cancellation signal;
    retrieving from memory an encoded matrix filtered signal received over channel M–1;
    combining the at least one noise cancellation signal with the encoded matrix filtered signal received over channel M–1, wherein combining the noise cancellation signal cancels unwanted noise on the encoded matrix filtered signal received over channel M−1; and decoding the encoded matrix filtered signal received over channel M−1 after combining to generate M−1 channel data.

2. The method of claim 1, wherein the decoding comprises decoding a block encoded signal and an entire block is received and decoded on channel M before initiating decoding channel M−1.

3. The method of claim 1, wherein the matrix filter comprises a feed-forward matrix filter configured to cancel self FEXT and distortion caused by transmission through a channel.

4. The method of claim 1, wherein the error term comprises the difference between an matrix filtered signal from the matrix filter for a particular channel and an output from a decoder for a particular channel.

5. The method of claim 1, wherein the memory is configured to store incoming encoded matrix filtered signals until processing on previous channels allows for processing of symbols on subsequent channels.

6. The method of claim 1, wherein the two or more channels comprises between six and fourteen channels and wherein filtering the noise term comprises providing the noise term to a filter that is tailored to generate a cancellation signal capable of canceling the noise term from each of the previous channels.

7. The method of claim 1, wherein the two or more channels comprise six to fourteen channels configured to transmit data over six to fourteen twisted pair conductors.

8. A method for processing two or more primary signals that are encoded and received over a multi-channel communication system, the processing configured to cancel unwanted coupling onto the two or more primary signals from alien signals, the method comprising:

receiving the two or more signals, wherein each of the two or more signals comprise primary components and coupling components;

storing at least one of the two or more signals in a memory;

for a first signal of the two or more signals, decoding the first signal and generating an error term associated with the first signal;

filtering the error term to generate a cancellation signal wherein the generating an error term comprises re-encoding the decoded signal and subtracting the re-encoded data from an encoded signal;

retrieving from memory at least a portion the second signal that was stored during decoding of the first signal;

combining the cancellation signal with at least a portion of the second signal to remove at least a portion of the coupling component from the second signal; and decoding the second signal.

9. The method of claim 8, wherein the signals comprise encoded symbols.

10. The method of claim 8, further comprising storing the decoded first signal in memory until completed with decoding the second signal.

11. The method of claim 8, wherein decoding generates data represented by an encoded signal.

12. The method of claim 8, wherein the encoded primary signals comprise block encoded and the first signal is received over a first channel and the second signal is received over a second channel, and an entire block is received on the first channel and is decoded before initiating decoding of a block received on the second channel.

13. A system for filtering a first encoded signal through Mth subsequent encoded signals received and associated with a first channel through Mth subsequent channels, the system comprising:

a matrix filter configured to perform matrix filtering on encoded signals prior to decoding or storage in memory;

a memory configured to store at least two incoming encoded signals prior to decoding;

a noise cancellation system associated with at least two channels configured to generate and process a cancellation signal;

a junction configured to combine the cancellation signal with an encoded subsequent signal on a subsequent channel to cancel noise on at least one encoded signal on at least one subsequent channel;

a decoder associated with at least one channel configured to decode an encoded signal after cancellation of noise by the junction; and a delay configured to delay an encoded signal to synchronize at least one encoded signal with a decoder output.

14. The system of claim 13, wherein a decoder is associated with each channel and decoders associated with channels other than a first channel to undergo processing retrieve encoded signals from the memory.

15. The system of claim 13, wherein the noise cancellation system further comprises a filter configured to processing the error term to generate the cancellation signal.

16. The system of claim 13, wherein an encoded signal comprises a signal encoded using a code selected from the group of codes consisting of trellis coded modulation, turbo coded modulation, convolutional code, and block product turbo code.

17. The system of claim 13, wherein the decoder is configured to provide a decoded signal to the noise cancellation system.

18. The system of claim 13, wherein the noise cancellation system receives error terms from each previously decoded channel.

19. A multiple input, multiple output system configured to process and decode a first encoded signal through Mth subsequent encoded signals received over a first channel through Mth subsequent channels, the system comprising:

a first channel decoder configured to receive and decode a first encoded signal received over a first channel to create a decoder output;

a junction associated with the first channel configured to calculate a first error term based on the decoder output and the first signal;

a first channel filter configured modify the first error term to generate a second channel cancellation signal;

a first junction associated with a second channel configured to combine the second channel cancellation signal with a second channel signal to create a noise cancelled second channel signal;

a second channel decoder configured to decode the noise cancelled second channel signal to create a second channel decoder output;

a second junction associated with a second channel configured to calculate a second error term based on the second channel decoder output and the second signal; and a second channel filter configured modify the first error term and the second error term to generate a third channel cancellation signal.

20. The system of claim 19, further comprising subsequent channels, wherein each channel has a decoder, filter, and one or more junctions configured to cancel noise and decode signals on the subsequent channels.

21. The system of claim 19, further comprising a memory associated with at least a second channel through Mth channel configured to store incoming second channel through Mth channel encoded signals.

22. The system of claim 19, wherein the error term comprises a difference between a decoded output and an encoded signal.

23. The system of claim 21, wherein the memory is further configured to store at least one error term.

24. The system of claim 21, wherein the memory is further configured to store decoder output.

25. The system of claim 19, further comprising at least one delay configured to synchronize timing of two or more signals.

26. A method for processing three or more primary signals that are encoded and received over a multi-channel communication system, the processing configured to cancel unwanted coupling onto the two more primary signals from alien signals, the method comprising:
    receiving the three or more signals over three or more channels, wherein each of the three or more signals comprises primary components and coupling components;
    storing at least one of the three or more signals in a memory;
    for a first signal of the three or more signals, decoding the first signal and generating a cancellation signal;
    retrieving from memory at least a portion the second signal that was stored during decoding of the first signal;
    combining the cancellation signal with the second signal of the three or more signals to remove at least a portion of the coupling component from the second signal; and
    decoding the second signal;
    processing the decoded first signal and the decoded second signal to generate a second cancellation signal;
    retrieving from memory at least a portion of the third signal;
    combining the second cancellation signal with the third signal; and
    decoding the third signal.

27. The method of claim 26, wherein the signals comprise encoded symbols.

28. The method of claim 26, wherein generating the cancellation signal comprises re-encoding a signal related to the difference between the transmitted signal and the received signal and subtracting this re-encoded signal from the second signal that is encoded.

29. The method of claim 26, further comprising storing the decoded first signal in memory until completed with decoding of all signals.

30. The method of claim 26, wherein the process of decoding signals, generating cancellation signal, and combining the cancellation signal with another signal occurs on each subsequent channel.

31. The method of claim 26, wherein an encoded signal comprises a block encoded signal and an entire block is received on the first channel and decoded before initiating decoding of a block received on a subsequent channel.

32. A system for filtering a first encoded signal through Mth subsequent encoded signals received and associated with a first channel through Mth subsequent channels, the system comprising:
    a matrix filter configured to perform matrix filtering on encoded signals prior to decoding or storage in memory;
    a memory configured to store at least two incoming encoded signals prior to decoding;
    a noise cancellation system associated with at least two channels configured to generate and process a cancellation signal, wherein the noise cancellation system further comprises a filter configured to processing an error term to generate the cancellation signal;
    a junction configured to combine the cancellation signal with an encoded subsequent signal on a subsequent channel to cancel noise on at least one encoded signal on at least one subsequent channel; and
    a decoder associated with at least one channel configured to decode an encoded signal after cancellation of noise by the junction.

33. The system of claim 32, wherein a decoder is associated with each channel and decoders associated with channels other than a first channel to undergo processing retrieve encoded signals from the memory.

34. The system of claim 32, further comprising a delay configured to delay an encoded signal to synchronize at least one encoded signal with a decoder output.

35. The system of claim 32, wherein an encoded signal comprises a signal encoded using a code selected from the group of codes consisting of trellis coded modulation, turbo coded modulation, convolutional code, and block product turbo code.

36. The system of claim 32, wherein the decoder is configured to provide a decoded signal to the noise cancellation system.

37. The system of claim 32, wherein the noise cancellation system receives error terms from each previously decoded channel.

38. A system for filtering a first encoded signal through Mth subsequent encoded signals received and associated with a first channel through Mth subsequent channels, the system comprising:
    a matrix filter configured to perform matrix filtering on at least two incoming encoded signals prior to decoding or storage in memory;
    a memory configured to store at least two incoming encoded signals prior to decoding;
    a noise cancellation system associated with at least two channels configured to generate and process a cancellation signal;
    a junction configured to combine the cancellation signal with an encoded subsequent signal on a subsequent channel to cancel noise on at least one encoded signal on at least one subsequent channel; and
    a decoder associated with at least one channel configured to decode an encoded signal after cancellation of noise by the junction.

39. The system of claim 38, wherein a decoder is associated with each channel and decoders associated with channels other than a first channel to undergo processing retrieve encoded signals from the memory.

40. The system of claim 38, further comprising a delay configured to delay an encoded signal to synchronize at least one encoded signal with a decoder output.

41. The system of claim 38, wherein the noise cancellation system further comprises a filter configured to processing an error term to generate the cancellation signal.

42. The system of claim 38, wherein an encoded signal comprises a signal encoded using a code selected from the group of codes consisting of trellis coded modulation, turbo coded modulation, convolutional code, and block product turbo code.

43. The system of claim 38, wherein the decoder is configured to provide a decoded signal to the noise cancellation system.

44. The system of claim 38, wherein the noise cancellation system receives error terms from each previously decoded channel.

45. A method for processing three or more primary signals that are encoded and received over a multi-channel communication system, the processing configured to cancel unwanted coupling onto the two more primary signals from alien signals, the method comprising:

receiving the three or more signals over three or more channels, wherein each of the three or more signals comprises primary components and coupling components;

storing at least one of the three or more signals in a memory;

for a first signal of the three or more signals, decoding the first signal and generating a cancellation signal;

retrieving from memory at least a portion the second signal that was stored during decoding of the first signal;

combining the cancellation signal with the second signal of the three or more signals to remove at least a portion of the coupling component from the second signal; and decoding the second signal;

wherein generating the cancellation signal comprises re-encoding a signal related to the difference between the transmitted signal and the received signal and subtracting this re-encoded signal from the second signal that is encoded.

46. The method of claim 45, further comprising:

processing the decoded first signal and the decoded second signal to generate a second cancellation signal;

retrieving from memory at least a portion of the third signal;

combining the second cancellation signal with the third signal; and decoding the third signal.

47. The method of claim 45, wherein the signals comprise encoded symbols.

48. The method of claim 45, further comprising storing the decoded first signal in memory until completed with decoding of all signals.

49. The method of claim 45, wherein the process of decoding signals, generating cancellation signal, and combining the cancellation signal with another signal occurs on each subsequent channel.

50. The method of claim 45, wherein an encoded signal comprises a block encoded signal and an entire block is received on the first channel and decoded before initiating decoding of a block received on a subsequent channel.

* * * * *